US009355331B2

(12) United States Patent
Andreopoulos et al.

(10) Patent No.: US 9,355,331 B2
(45) Date of Patent: May 31, 2016

(54) EXTRACTING SALIENT FEATURES FROM VIDEO USING A NEUROSYNAPTIC SYSTEM

(71) Applicant: International Business Machines Corporation, Armonk, NY (US)

(72) Inventors: Alexander Andreopoulos, San Jose, CA (US); Steven K. Esser, San Jose, CA (US); Dharmendra S. Modha, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/850,046

(22) Filed: Sep. 10, 2015

(65) Prior Publication Data

US 2016/0004931 A1  Jan. 7, 2016

Related U.S. Application Data

(63) Continuation of application No. 14/265,268, filed on Apr. 29, 2014.

(51) Int. Cl.
*G06K 9/00* (2006.01)
*G06K 9/46* (2006.01)
*G06K 9/66* (2006.01)

(52) U.S. Cl.
CPC ............ *G06K 9/4676* (2013.01); *G06K 9/4604* (2013.01); *G06K 9/4652* (2013.01); *G06K 9/66* (2013.01)

(58) Field of Classification Search
None
See application file for complete search history.

(56) References Cited

U.S. PATENT DOCUMENTS

| 5,634,087 | A | 5/1997 | Mammone et al. |
| 6,018,740 | A | 1/2000 | Ito |
| 6,757,666 | B1 | 6/2004 | Thomas |
| 7,636,098 | B2 | 12/2009 | Yang et al. |
| 7,707,128 | B2 | 4/2010 | Matsugu |

(Continued)

FOREIGN PATENT DOCUMENTS

| CN | 102088597 A | 6/2011 |
| CN | 102864499 A | 1/2013 |

OTHER PUBLICATIONS

Sima, H. et al., "Color Image Segmentation Based on Regional Saliency", Proceedings of the 19th International Conference on Neural Information Processing (ICONIP 2012), Part V, Nov. 12-15, 2012, pp. 142-150, Springer Verlag, Germany.

(Continued)

*Primary Examiner* — Aaron W Carter
(74) *Attorney, Agent, or Firm* — Sherman IP LLP; Kenneth L. Sherman; Hemavathy Perumal

(57) ABSTRACT

Embodiments of the invention provide a method of visual saliency estimation comprising receiving an input sequence of image frames. Each image frame has one or more channels, and each channel has one or more pixels. The method further comprises, for each channel of each image frame, generating corresponding neural spiking data based on a pixel intensity of each pixel of the channel, generating a corresponding multi-scale data structure based on the corresponding neural spiking data, and extracting a corresponding map of features from the corresponding multi-scale data structure. The multi-scale data structure comprises one or more data layers, wherein each data layer represents a spike representation of pixel intensities of a channel at a corresponding scale. The method further comprises encoding each map of features extracted as neural spikes.

20 Claims, 16 Drawing Sheets

(56) References Cited

U.S. PATENT DOCUMENTS

| | | |
|---|---|---|
| 7,958,071 B2 | 6/2011 | Snider et al. |
| 8,098,886 B2 | 1/2012 | Koch et al. |
| 8,332,340 B2 | 12/2012 | Snider |
| 8,369,652 B1 | 2/2013 | Khosla et al. |
| 8,385,654 B2 | 2/2013 | Gu et al. |
| 8,401,297 B1 | 3/2013 | Apostolos et al. |
| 8,626,686 B1* | 1/2014 | Rhodes ............... G06N 3/04 382/156 |
| 8,699,767 B1 | 4/2014 | Khosla et al. |
| 8,907,971 B2 | 12/2014 | Ballestad et al. |
| 8,977,582 B2 | 3/2015 | Richert |
| 9,070,039 B2 | 6/2015 | Richert |
| 9,239,985 B2* | 1/2016 | Piekniewski ............ G06N 3/08 |
| 2002/0154833 A1 | 10/2002 | Koch et al. |
| 2005/0190966 A1 | 9/2005 | Etienne-Cummings et al. |
| 2006/0182339 A1 | 8/2006 | Connell |
| 2008/0080787 A1* | 4/2008 | Yang ..................... G06T 5/50 382/284 |
| 2008/0089591 A1 | 4/2008 | Zhou |
| 2008/0201282 A1 | 8/2008 | Garcia et al. |
| 2010/0172584 A1 | 7/2010 | Lukac et al. |
| 2010/0241601 A1 | 9/2010 | Carson et al. |
| 2010/0312730 A1 | 12/2010 | Weng et al. |
| 2012/0011089 A1 | 1/2012 | Aparin |
| 2012/0109863 A1 | 5/2012 | Esser |
| 2012/0109864 A1 | 5/2012 | Modha |
| 2012/0109866 A1 | 5/2012 | Modha |
| 2012/0173471 A1 | 7/2012 | Ananthanarayanan et al. |
| 2012/0192048 A1 | 7/2012 | Suzuki et al. |
| 2012/0256941 A1* | 10/2012 | Ballestad .......... G06K 9/00234 345/589 |
| 2012/0259804 A1 | 10/2012 | Brezzo |
| 2012/0308076 A1 | 12/2012 | Piekniewski et al. |
| 2013/0018832 A1 | 1/2013 | Ramanathan et al. |
| 2013/0073493 A1 | 3/2013 | Modha |
| 2013/0131985 A1 | 5/2013 | Weiland et al. |
| 2014/0016858 A1* | 1/2014 | Richert ................... G06K 9/62 382/156 |
| 2014/0122399 A1* | 5/2014 | Szatmary ............... G06N 3/049 706/15 |
| 2014/0122400 A1* | 5/2014 | Szatmary ............... G06N 3/049 706/15 |
| 2014/0143193 A1 | 5/2014 | Zheng et al. |
| 2014/0193066 A1* | 7/2014 | Richert .................... G06T 1/20 382/158 |
| 2014/0219497 A1* | 8/2014 | Richert ................... G06K 9/36 382/103 |
| 2014/0222740 A1* | 8/2014 | Alvarez-Icaza Rivera ................. G06N 3/063 706/28 |
| 2014/0258199 A1* | 9/2014 | Modha .................... G06N 3/02 706/26 |
| 2015/0139537 A1 | 5/2015 | Milner et al. |
| 2015/0242690 A1* | 8/2015 | Richert .................... G06N 3/08 382/103 |
| 2015/0254551 A1* | 9/2015 | Alvarez-Icaza Rivera ................. G06N 3/049 706/29 |
| 2015/0269439 A1* | 9/2015 | Versace ............. G06K 9/00664 382/103 |
| 2015/0278628 A1* | 10/2015 | Agrawal ............. G06K 9/4647 382/156 |
| 2015/0278641 A1* | 10/2015 | Agrawal ................. G06K 9/66 382/157 |
| 2015/0310303 A1* | 10/2015 | Andreopoulos ..... G06K 9/4676 382/158 |
| 2015/0324684 A1* | 11/2015 | Alvarez-Icaza Rivera ................. G06N 3/04 706/26 |
| 2015/0339589 A1* | 11/2015 | Fisher ................. G06N 99/005 706/12 |
| 2015/0347870 A1* | 12/2015 | Andreopoulos ..... G06K 9/6267 382/190 |
| 2015/0379689 A1* | 12/2015 | Andreopoulos ....... G06T 3/4046 382/158 |
| 2016/0004961 A1* | 1/2016 | Appuswamy ............ G06N 3/04 706/20 |
| 2016/0004962 A1* | 1/2016 | Appuswamy ............ G06N 3/04 706/20 |

OTHER PUBLICATIONS

Vogelstein, R.J. et al., "A Multichip Neuromorphic System for Spike-Based Visual Information Processing", Neural Computation, 2007, pp. 2281-2300, vol. 19, Massachusetts Institute of Technology, United States.

Yin, Z. et al., "Likelihood Map Fusion for Visual Object Tracking", Proceedings of the 2008 Winter Workshop on Application of Computer Vision, Mistubishi Electric Research Laboratories, Mar. 2008, pp. 1-9, IEEE, United States.

Yan, W. et al., "Salient Region Detection Algorithm Based on Frequency and Spatial Domain Analysis", Computer Engineering, Sep. 5, 2012, pp. 166-170, vol. 38, No. 17, China (English-language Abstract attached, p. 1).

Andreopoulos, A. et al., "Visual saliency on networks of neurosynaptic cores", Mar. 2015, pp. 1-16, vol. 59, No. 2-3, IBM, United States.

* cited by examiner

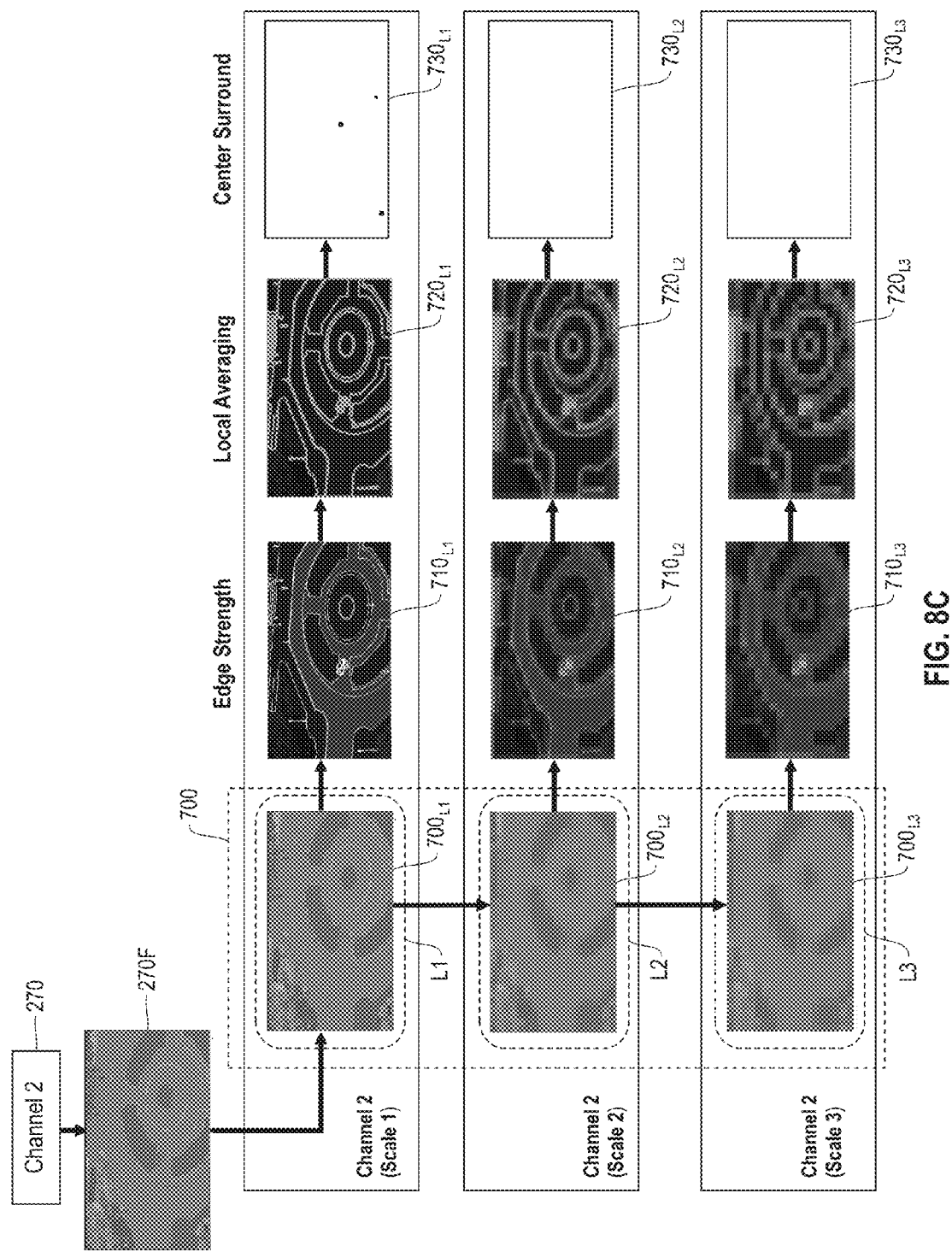

ABSTRACT# EXTRACTING SALIENT FEATURES FROM VIDEO USING A NEUROSYNAPTIC SYSTEM

This invention was made with Government support under HR0011-09-C-0002 awarded by Defense Advanced Research Projects Agency (DARPA). The Government has certain rights in this invention.

BACKGROUND

The present invention relates to neuromorphic and synaptronic computation, and in particular, extracting salient features from video using a neurosynaptic system.

Neuromorphic and synaptronic computation, also referred to as artificial neural networks, are computational systems that permit electronic systems to essentially function in a manner analogous to that of biological brains. Neuromorphic and synaptronic computation do not generally utilize the traditional digital model of manipulating 0s and 1s. Instead, neuromorphic and synaptronic computation create connections between processing elements that are roughly functionally equivalent to neurons of a biological brain. Neuromorphic and synaptronic computation may comprise various electronic circuits that are modeled on biological neurons.

In biological systems, the point of contact between an axon of a neural module and a dendrite on another neuron is called a synapse, and with respect to the synapse, the two neurons are respectively called pre-synaptic and post-synaptic. The essence of our individual experiences is stored in conductance of the synapses. The synaptic conductance changes with time as a function of the relative spike times of pre-synaptic and post-synaptic neurons, as per spike-timing dependent plasticity (STDP). The STDP rule increases the conductance of a synapse if its post-synaptic neuron fires after its pre-synaptic neuron fires, and decreases the conductance of a synapse if the order of the two firings is reversed.

BRIEF SUMMARY

One embodiment of the present invention provides a method of visual saliency estimation. The method comprises receiving an input sequence of image frames. Each image frame has one or more channels of pixels. The method further comprises generating, for each channel of each image frame, corresponding neural spiking data representing a pixel intensity of each pixel of the channel, and generating, based on the neural spiking data, a corresponding multi-scale data structure comprising one or more data layers. Each data layer outputs a neural spiking representation based on spatial subsampling of the neural spiking data at a given subsampling scale. The method further comprises extracting a corresponding map of features for each data layer of the multi-scale data structure by processing a neural spiking representation outputted by the data layer, and encoding features of each map of features extracted as neural spikes.

Another embodiment of the present invention provides a neuromorphic saliency system. The system comprises a transducer unit for receiving an input sequence of image frames. Each image frame has one or more channels of pixels. For each channel of each image frame, the transducer unit generates corresponding neural spiking data based on a pixel intensity of each pixel of the channel. The system further comprises a multi-scale spatio-temporal saliency corelet including one or more neurosynaptic core circuits. For each channel of each image frame, the core circuits generate, based on corresponding neural spiking data, a corresponding multi-scale data structure comprising one or more data layers. Each data layer outputs a neural spiking representation based on spatial subsampling of the neural spiking data at a given subsampling scale. The core circuits extract a corresponding map of features for each data layer of the multi-scale data structure by processing a neural spiking representation outputted by the data layer, and encode features of each map of features extracted as neural spikes. Each map of features extracted is merged into a single map of features representing estimated visual saliency for the input sequence of image frames.

These and other features, aspects, and advantages of the present invention will become understood with reference to the following description, appended claims, and accompanying figures.

BRIEF DESCRIPTION OF THE SEVERAL VIEWS OF THE DRAWINGS

FIG. 8C illustrates extracting spatial saliency features for a second channel, in accordance with an embodiment of the invention

DETAILED DESCRIPTION

Figure 1:
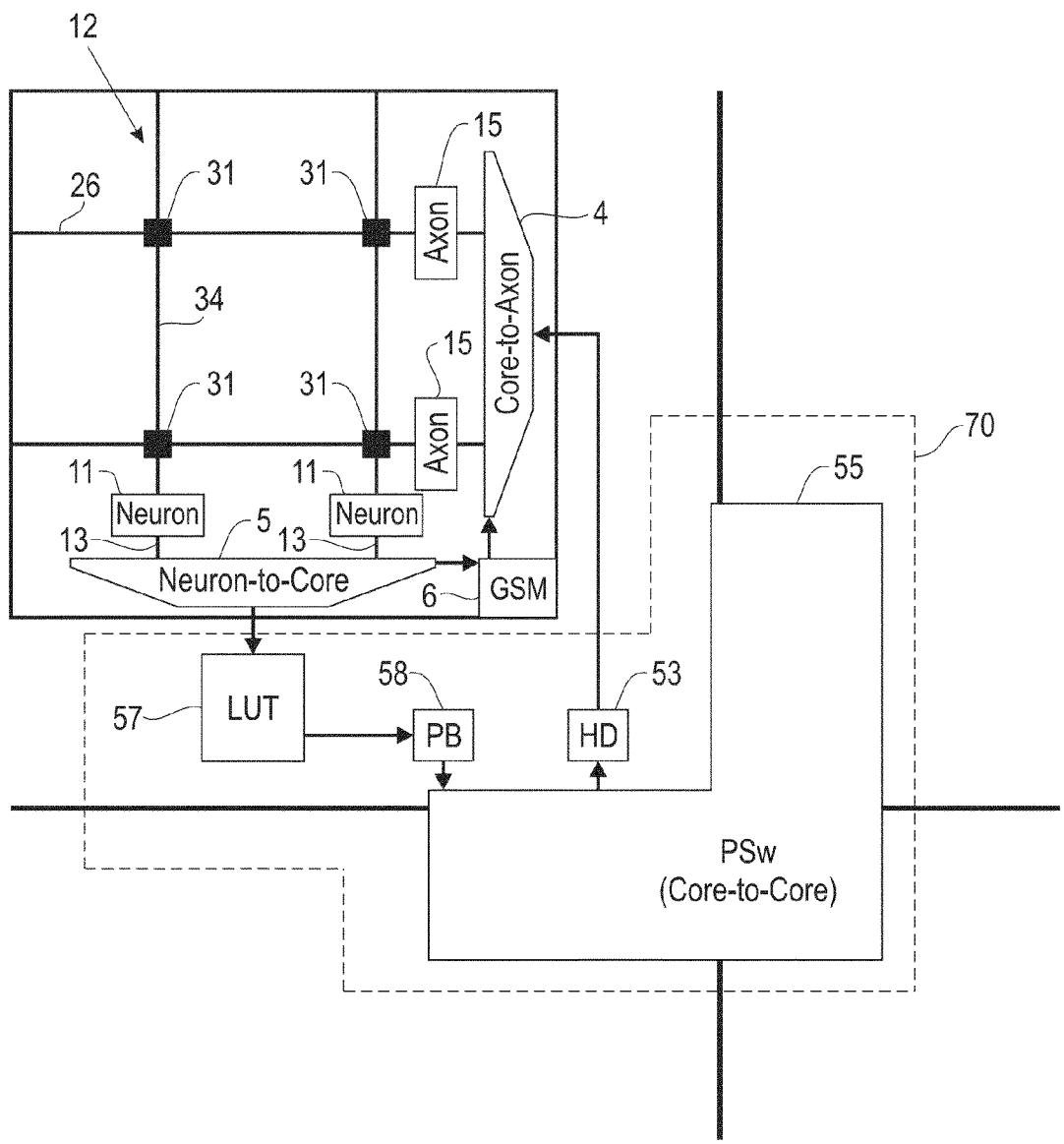
FIG. 1 illustrates an example neurosynaptic core circuit ("core circuit"), in accordance with an embodiment of the invention.

The present invention relates to neuromorphic and synaptronic computation, and in particular, extracting salient features from video using a neurosynaptic system. In one embodiment, an input sequence of image frames is received. Each image frame has one or more channels of pixels. For each channel of each image frame, corresponding neural spiking data based on a pixel intensity of each pixel of the channel is generated. Based on the neural spiking data, a corresponding multi-scale data structure comprising one or more data layers is also generated. Each data layer outputs a neural spiking representation based on spatial subsampling of the neural spiking data at a given subsampling scale. A corresponding map of features is extracted from each data layer, and features of each map of features extracted are encoded as neural spikes. Each map of features extracted is merged into a single map of features representing estimated visual saliency for the input sequence of image frames.

In one embodiment, a neurosynaptic system comprises a system that implements neuron models, synaptic models, neural algorithms, and/or synaptic algorithms. In one embodiment, a neurosynaptic system comprises software components and/or hardware components, such as digital hardware, analog hardware or a combination of analog and digital hardware (i.e., mixed-mode).

The term electronic neuron as used herein represents an architecture configured to simulate a biological neuron. An electronic neuron creates connections between processing elements that are roughly functionally equivalent to neurons of a biological brain. As such, a neuromorphic and synaptronic computation comprising electronic neurons according to embodiments of the invention may include various electronic circuits that are modeled on biological neurons. Further, a neuromorphic and synaptronic computation comprising electronic neurons according to embodiments of the invention may include various processing elements (including computer simulations) that are modeled on biological neurons. Although certain illustrative embodiments of the invention are described herein using electronic neurons comprising electronic circuits, the present invention is not limited to electronic circuits. A neuromorphic and synaptronic computation according to embodiments of the invention can be implemented as a neuromorphic and synaptronic architecture comprising circuitry, and additionally as a computer simulation. Indeed, embodiments of the invention can take the form of an entirely hardware embodiment, an entirely software embodiment or an embodiment containing both hardware and software elements.

The term electronic axon as used herein represents an architecture configured to simulate a biological axon that transmits information from one biological neuron to different biological neurons. In one embodiment, an electronic axon comprises a circuit architecture. An electronic axon is functionally equivalent to axons of a biological brain. As such, neuromorphic and synaptronic computation involving electronic axons according to embodiments of the invention may include various electronic circuits that are modeled on biological axons. Although certain illustrative embodiments of the invention are described herein using electronic axons comprising electronic circuits, the present invention is not limited to electronic circuits.

FIG. 1 illustrates an example neurosynaptic core circuit ("core circuit") 10, in accordance with an embodiment of the invention. The core circuit 10 comprises a plurality of electronic neurons ("neurons") 11 and a plurality of electronic axons ("axons") 15. The neurons 11 and the axons 15 are interconnected via an m×n crossbar 12 comprising multiple intra-core electronic synapse devices ("synapses") 31, multiple rows/axon paths 26, and multiple columns/dendrite paths 34, wherein "x" represents multiplication, and m and n are positive integers.

Each synapse 31 communicates firing events (e.g., spike events) between an axon 15 and a neuron 11. Specifically, each synapse 31 is located at cross-point junction between an axon path 26 and a dendrite path 34, such that a connection between the axon path 26 and the dendrite path 34 is made through the synapse 31. Each axon 15 is connected to an axon path 26, and sends firing events to the connected axon path 26. Each neuron 11 is connected to a dendrite path 34, and receives firing events from the connected dendrite path 34. Therefore, each synapse 31 interconnects an axon 15 to a neuron 11, wherein, with respect to the synapse 31, the axon 15 and the neuron 11 represent an axon of a pre-synaptic neuron and a dendrite of a post-synaptic neuron, respectively.

Each synapse 31 and each neuron 11 has configurable operational parameters. In one embodiment, the core circuit 10 is a uni-directional core, wherein the neurons 11 and the axons 15 of the core circuit 10 are arranged as a single neuron array and a single axon array, respectively. In another embodiment, the core circuit 10 is a bi-directional core, wherein the neurons 11 and the axons 15 of the core circuit 10 are arranged as two neuron arrays and two axon arrays, respectively. For example, a bi-directional core circuit 10 may have a horizontal neuron array, a vertical neuron array, a horizontal axon array and a vertical axon array, wherein the crossbar 12 interconnects the horizontal neuron array and the vertical neuron array with the vertical axon array and the horizontal axon array, respectively.

In response to the firing events received, each neuron 11 generates a firing event according to a neuronal activation function. A preferred embodiment for the neuronal activation function can be leaky integrate-and-fire.

An external two-way communication environment may supply sensory inputs and consume motor outputs. The neurons 11 and axons 15 are implemented using complementary metal-oxide semiconductor (CMOS) logic gates that receive firing events and generate a firing event according to the neuronal activation function. In one embodiment, the neurons 11 and axons 15 include comparator circuits that generate firing events according to the neuronal activation function. In one embodiment, the synapses 31 are implemented using 1-bit static random-access memory (SRAM) cells. Neurons 11 that generate a firing event are selected one at a time, and the firing events are delivered to target axons 15, wherein the target axons 15 may reside in the same core circuit 10 or somewhere else in a larger system with many core circuits 10.

As shown in FIG. 1, the core circuit 10 further comprises an address-event receiver (Core-to-Axon) 4, an address-event transmitter (Neuron-to-Core) 5, and a controller 6 that functions as a global state machine (GSM). The address-event receiver 4 receives firing events and transmits them to target axons 15. The address-event transmitter 5 transmits firing events generated by the neurons 11 to the core circuits 10 including the target axons 15.

The controller 6 sequences event activity within a time-step. The controller 6 divides each time-step into operational phases in the core circuit 10 for neuron updates, etc. In one embodiment, within a time-step, multiple neuron updates and synapse updates are sequentially handled in a read phase and a write phase, respectively. Further, variable time-steps may be utilized wherein the start of a next time-step may be triggered using handshaking signals whenever the neuron/synapse operation of the previous time-step is completed. For external communication, pipelining may be utilized wherein load inputs, neuron/synapse operation, and send outputs are pipelined (this effectively hides the input/output operating latency).

As shown in FIG. 1, the core circuit 10 further comprises a routing fabric 70. The routing fabric 70 is configured to selectively route neuronal firing events among core circuits 10. The routing fabric 70 comprises a firing events address lookup table (LUT) module 57, a packet builder (PB) module 58, a head delete (HD) module 53, and a core-to-core packet switch (PSw) 55. The LUT 57 is an N address routing table is configured to determine target axons 15 for firing events generated by the neurons 11 in the core circuit 10. The target axons 15 may be axons 15 in the same core circuit 10 or other core circuits 10. The LUT 57 retrieves information such as target distance, direction, addresses, and delivery times (e.g., about 19 bits/packet×4 packets/neuron). The LUT 57 converts firing events generated by the neurons 11 into forwarding addresses of the target axons 15.

The PB 58 packetizes the routing information retrieved by the LUT 57 into outgoing address-event packets. The core-to-core PSw 55 is an up-down-left-right mesh router configured to direct the outgoing address-event packets to the core circuits 10 containing the target axons 15. The core-to-core PSw 55 is also configured to receive incoming address-event packets from the core circuits 10. The HD 53 removes routing information from an incoming address-event packet to deliver it as a time stamped firing event to the address-event receiver 4.

In one example implementation, the core circuit 10 may comprise 256 neurons 11. The crossbar 12 may be a 256×256 ultra-dense crossbar array that has a pitch in the range of about 0.1 nm to 10 μm. The LUT 57 of the core circuit 10 may comprise 256 address entries, each entry of length 32 bits.

In one embodiment, soft-wiring in the core circuit 10 is implemented using address events (e.g., Address-Event Representation (AER)). Firing event (i.e., spike event) arrival times included in address events may be deterministic or non-deterministic.

Although certain illustrative embodiments of the invention are described herein using synapses comprising electronic circuits, the present invention is not limited to electronic circuits.

Figure 2:
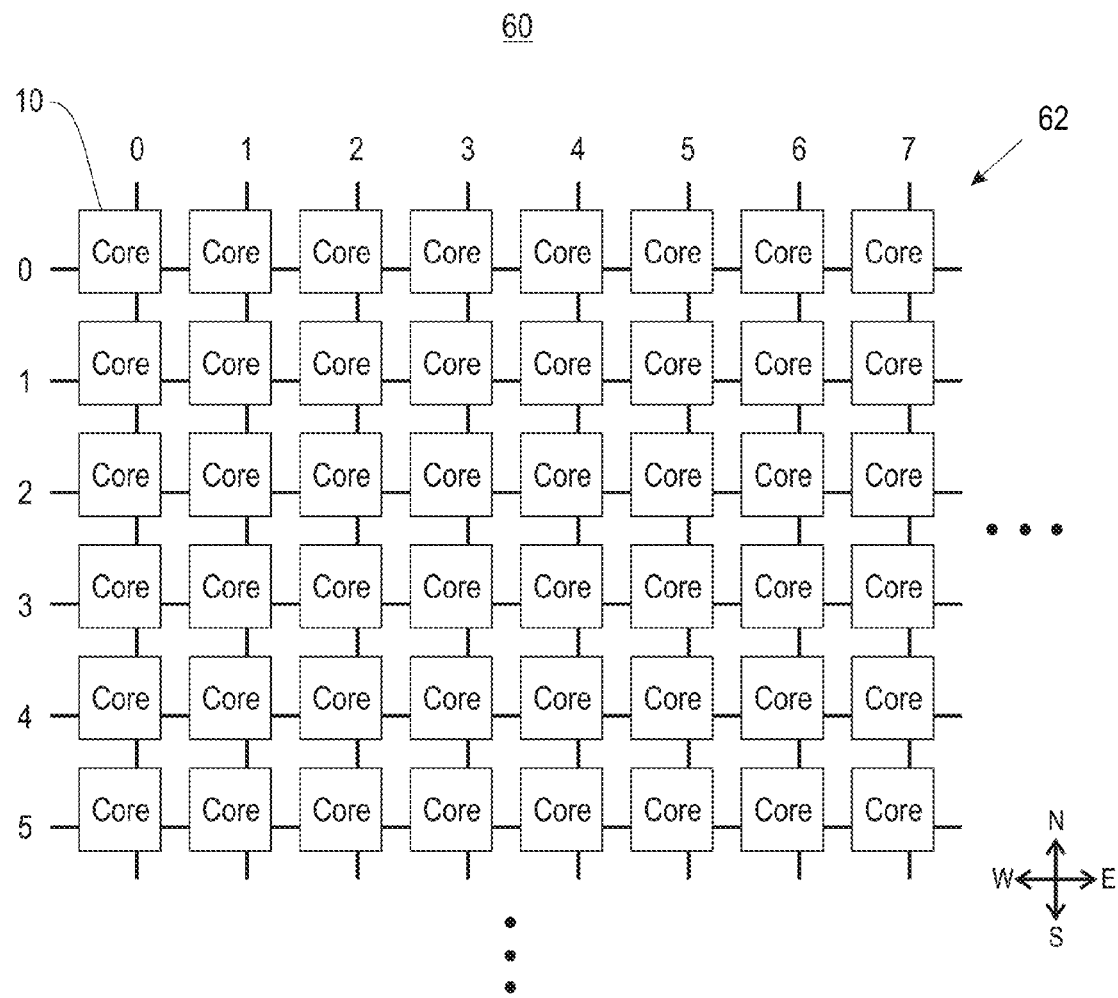
FIG. 2 illustrates an example neurosynaptic network circuit, in accordance with an embodiment of the invention.

FIG. 2 illustrates an example neurosynaptic network circuit 60, in accordance with an embodiment of the invention. The network circuit 60 is an example multi-core neurosynaptic system comprising multiple interconnected core circuits 10. In one embodiment, the core circuits 10 are arranged as a two-dimensional tile-able core array 62. Each core circuit 10 may be identified by its Cartesian coordinates as core (i, j), wherein i is a row index and j is a column index of the core array 62 (i.e., core (0,0), core (0,1), . . . , core (5,7)).

Each core circuit 10 utilizes its core-to-core PSw 55 (FIG. 1) to pass along neuronal firing events in the eastbound, westbound, northbound, or southbound direction. For example, a neuron 11 (FIG. 1) of the core circuit (0,0) may generate a firing event targeting an incoming axon 15 (FIG. 1) of the core circuit (5,7). To reach the core circuit (5,7), the firing event may traverse seven core circuits 10 in the eastbound direction (i.e., from core (0,0) to cores (0,1), (0,2), (0,3), (0,4), (0,5), (0,6), and (0,7)), and five core circuits 10 in the southbound direction (i.e., from core (0,7) to cores (1, 7), (2, 7), (3, 7), (4, 7), and (5, 7)) via the core-to-core PSws 55 of the network circuit 60.

Figure 3:
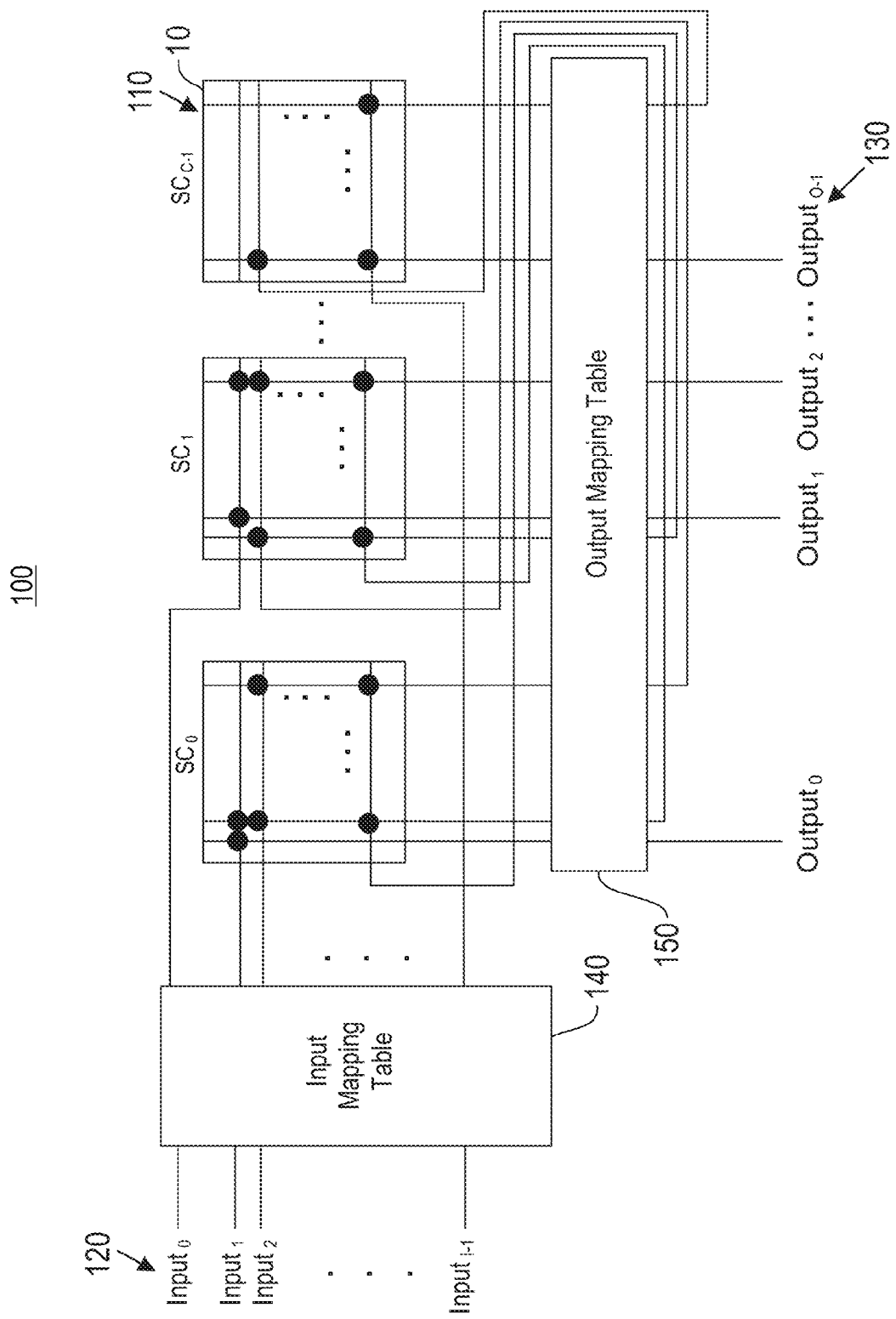
FIG. 3 illustrates an example corelet for at least one core circuit, in accordance with an embodiment of the invention.

FIG. 3 illustrates an example corelet 100 for at least one core circuit 10, in accordance with an embodiment of the invention. A corelet 100 is a structural description of one or more core circuits 10. Corelets 100 are applicable to different types of neural core circuits. In one embodiment, a corelet 100 is a static configuration file for programming a portion (i.e., a fraction) of a core circuit 10 or an entire core circuit 10. Corelets 100 may also be composed in a hierarchical fashion, such that a corelet 100 may be used to program two or more corelets 100 representing multiple interconnected core circuits 10.

A corelet 100 may program the neuronal activity of one or more core circuits 10 of the neural network circuit 60. For example, a corelet 100 may be used to program the routing fabric 70 of a core circuit 10. Other examples of activities a corelet 100 may program a core circuit 10 to perform edge detection in image/video, motion history tracking in video, object classification, sense-response in a robotic environment, and sound filtering.

Each corelet 100 comprises C constituent units ("constituent sub-corelets") 110, wherein C is an integer greater than or equal to one. Each sub-corelet 110 defines one of the following: a portion (i.e., a fraction) of a core circuit 10, an entire core circuit 10, or a corelet 100 that in turn defines multiple interconnected core circuits 10. For example, as shown in FIG. 3, each sub-corelet 110 represents a core circuit 10.

All sub-corelets 110 of the corelet 100 are numbered. For example, each sub-corelet 110 may be identified by a corresponding index SC, wherein $0 \leq i \leq C-1$.

The corelet 100 receives I inputs 120, wherein I is an integer greater than or equal to one. Each input 120 may represent a firing event from another corelet 100 or an input from an external system, such as sensory input from an external sensory system. All inputs 120 received by the corelet 100 are addressed. For example, each input 120 may be addressed by a corresponding index Input, wherein $0 \leq j \leq I-1$.

The corelet 100 generates O outputs 130, wherein O is an integer greater than or equal to one. Each output 130 may represent a firing event generated by a neuron 11 of a sub-corelet 110. Each output 130 may be routed to another corelet 100 or an external system, such as an external motor system. All outputs 130 generated by the corelet 100 are addressed. For example, each output 130 may be addressed by a corresponding index $Output_k$, wherein $0 \leq k \leq O-1$.

The corelet 100 further comprises an input mapping table 140 and an output mapping table 150. In one embodiment, each table 140, 150 is a routing table that maintains routing information. As described in detail later herein, the input mapping table 140 maintains routing information for each input 120 received by the corelet 100. Based on the input mapping table 140, each received input 120 is mapped to an input of a sub-corelet 110 within the corelet 100. If each sub-corelet 110 is a core circuit 10, each received input 120 is mapped to a target incoming axon 15. If each sub-corelet 110 is a corelet 100, each received input 120 is mapped to an input 120 of a corelet 100.

The output mapping table 150 maintains routing information for each output generated by each sub-corelet 110 of the corelet 100. If a sub-corelet 110 is a core circuit 10, the output generated by the sub-corelet 110 is a firing event. If a sub-corelet 110 is a corelet 100, the output generated by the sub-corelet 110 is an output 130. Based on the output mapping table 150, each output generated by a sub-corelet 110 is mapped to one of the following: an input of a sub-corelet 110 within the corelet 100 (e.g., a target incoming axon 15, or an input 120 of a corelet 100), or an output 130 of the corelet 100. As stated above, each output 130 is routed to another corelet 100 or an external system, such as an external motor system.

The example corelet 100 shown in FIG. 3 comprises three sub-corelets 110, wherein each sub-corelet 110 represents a core circuit 10. In one embodiment, each core circuit 10 comprises a 256×256 ultra-dense crossbar 12 (FIG. 1) of synapses 31 (FIG. 1) that interconnects 256 neurons 11 (FIG. 1) with 256 incoming axons 15 (FIG. 1). At maximum, the corelet 100 in FIG. 3 has about 768 (i.e., 256×3) inputs 120 and about 768 (i.e., 256×3) outputs 130. The number of inputs 120 and the number of outputs 130 may be less, depending on the interconnections between the sub-corelets 110 as determined by the input mapping table 140 and the output mapping table 150.

Figure 4:
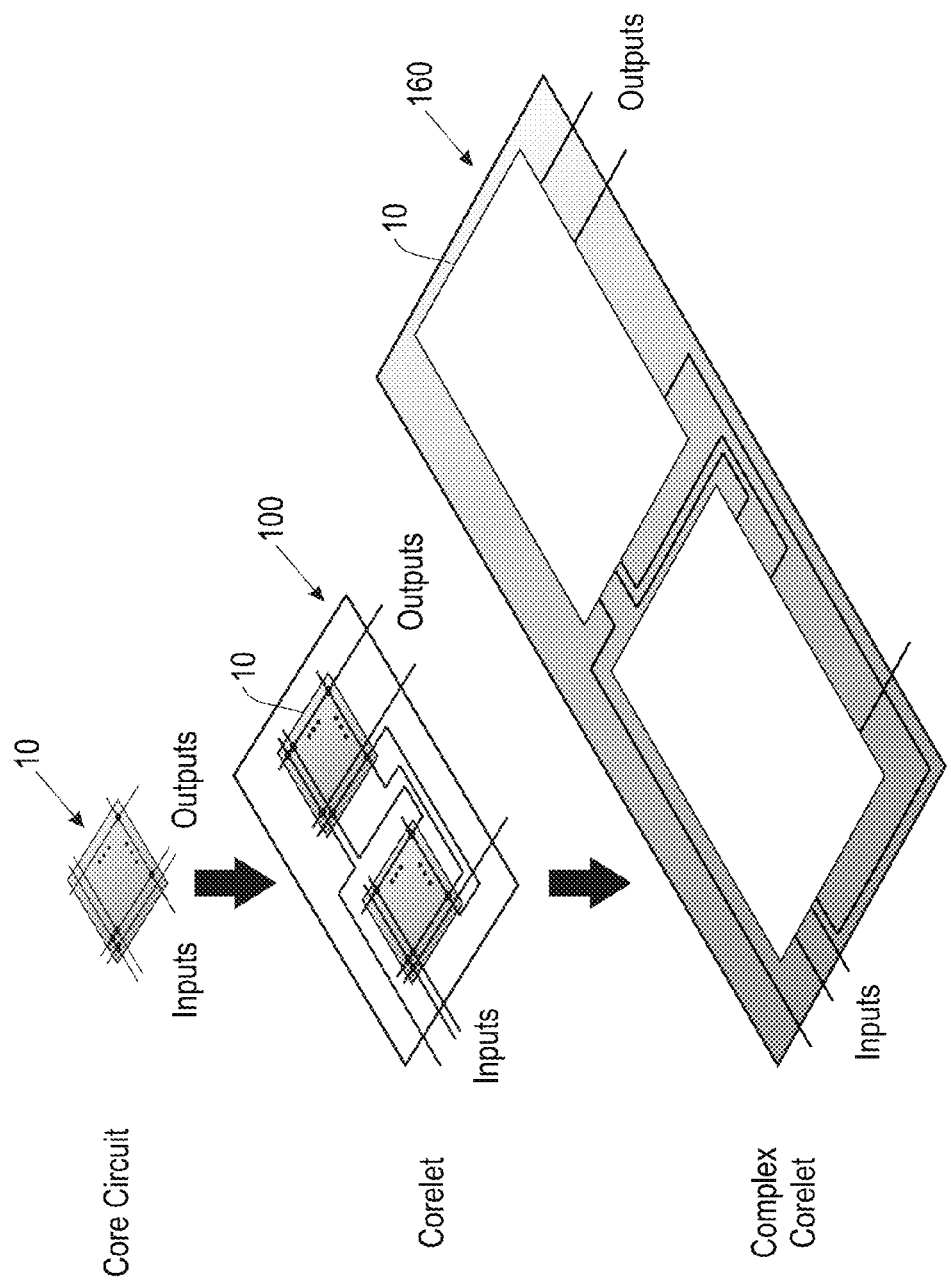
FIG. 4 illustrates a hierarchical composition of corelets, in accordance with an embodiment of the invention.

FIG. 4 illustrates a hierarchical composition of corelets 100, in accordance with an embodiment of the invention. Each corelet 100 is modular, reusable, and scalable. Corelets 100 may be combined to form a corelet 100. In one embodiment, a complex corelet 160 is a corelet 100 that is composed of at least two corelets 100. Complex corelets 160 are used to program multiple corelets 100 representing multiple interconnected core circuits 10.

In one embodiment, a neurosynaptic system configured using corelets 100 may be used to extract salient features from video comprising a sequence of image frames. For each image frame, the system is configured to detect one or more salient image regions by identifying one or more subsets of pixels where one or more changes having occurred over time. For each image frame, the system is further configured to detect one or more salient image regions by identifying one or more subsets of pixels where the features extracted differ from features extracted from one or more local surrounding regions.

Figure 5:
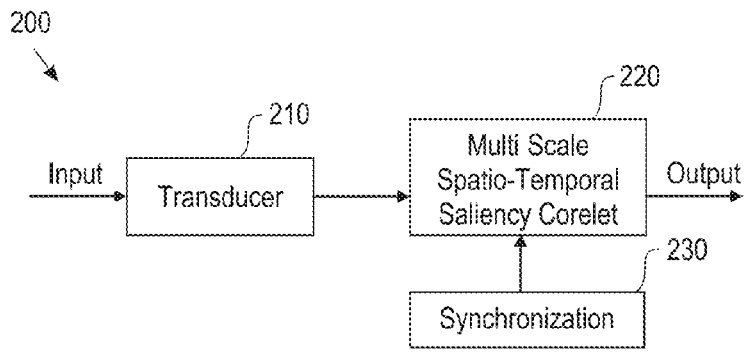
FIG. 5 illustrates an example saliency system, in accordance with an embodiment of the invention.

FIG. 5 illustrates an example saliency system 200, in accordance with an embodiment of the invention. The saliency system 200 extracts one or more salient features from an input video 250 (FIG. 6) comprising an input sequence of image frames 250F (FIG. 6), wherein each image frame 250F has one or more channels of pixels. Based on the salient features extracted, the saliency system 200 determines one or more regions of interest in the input video 250. In one embodiment, the saliency system 200 comprises a transducer unit 210, a multi-scale spatio-temporal saliency corelet 220, and a synchronization unit 230.

The transducer unit 210 receives an input video 250, and pre-processes the input video 250 for feature extraction. As described in detail later herein, the transducer unit 210 generates, for each channel of each image frame, corresponding neural spiking data including neural spikes (i.e., neuronal firing events), wherein the corresponding neural spiking data represents a pixel intensity of each pixel of the channel.

The multi-scale spatio-temporal saliency corelet 220 is an example complex corelet 160 comprising multiple corelets 100. The saliency system 200 utilizes the multi-scale spatio-temporal saliency corelet 220 for feature extraction. As described in detail later herein, the saliency system 200 utilizes the multi-scale spatio-temporal saliency corelet 220 to generate, for each channel of each image frame, a corresponding multi-scale data structure based on corresponding neural spiking data, wherein the corresponding multi-scale data structure comprises one or more data layers, and wherein each data layer outputs a neural spiking representation based on spatial subsampling of the corresponding neural spiking data at a given subsampling scale. For each data layer of the corresponding multi-scale data structure, the multi-scale spatio-temporal saliency corelet 220 extracts a corresponding map of features by processing a neural spiking representation outputted by the data layer. The map of features extracted may include at least one motion saliency feature and at least one spatial saliency feature. For each map of features extracted, the multi-scale spatio-temporal saliency corelet 220 encodes features of the map of features as neural spikes. The multi-scale spatio-temporal saliency corelet 220 merges each map of features extracted into a single map of features representing estimated visual saliency for the input video 250.

In one embodiment, the single map of features includes neural spiking data representing a value of each output pixel.

In one embodiment, for each data layer of each multi-scale data structure, a map of features corresponding to the data layer is equal to a neural spiking representation outputted by the data layer.

The synchronization unit 230 generates periodic control pulses for synchronizing the corelets 100 of the multi-scale spatio-temporal saliency corelet 220.

In one embodiment, the input video 250 constitutes one or more image frames 250F that are not necessarily related to each other.

In one embodiment, each map of features extracted is a retinotopic map of features.

In one embodiment, each multi-scale data structure corresponding to each channel of each image frame is a distinct multi-scale pyramidal representation of the channel of the image frame, such as a Gaussian pyramid.

In one embodiment, for each data layer of each multi-scale data structure, extracting a corresponding map of features by processing a neural spiking representation outputted by the data layer comprises determining one or more intermediate retinotopic maps.

Figure 6:
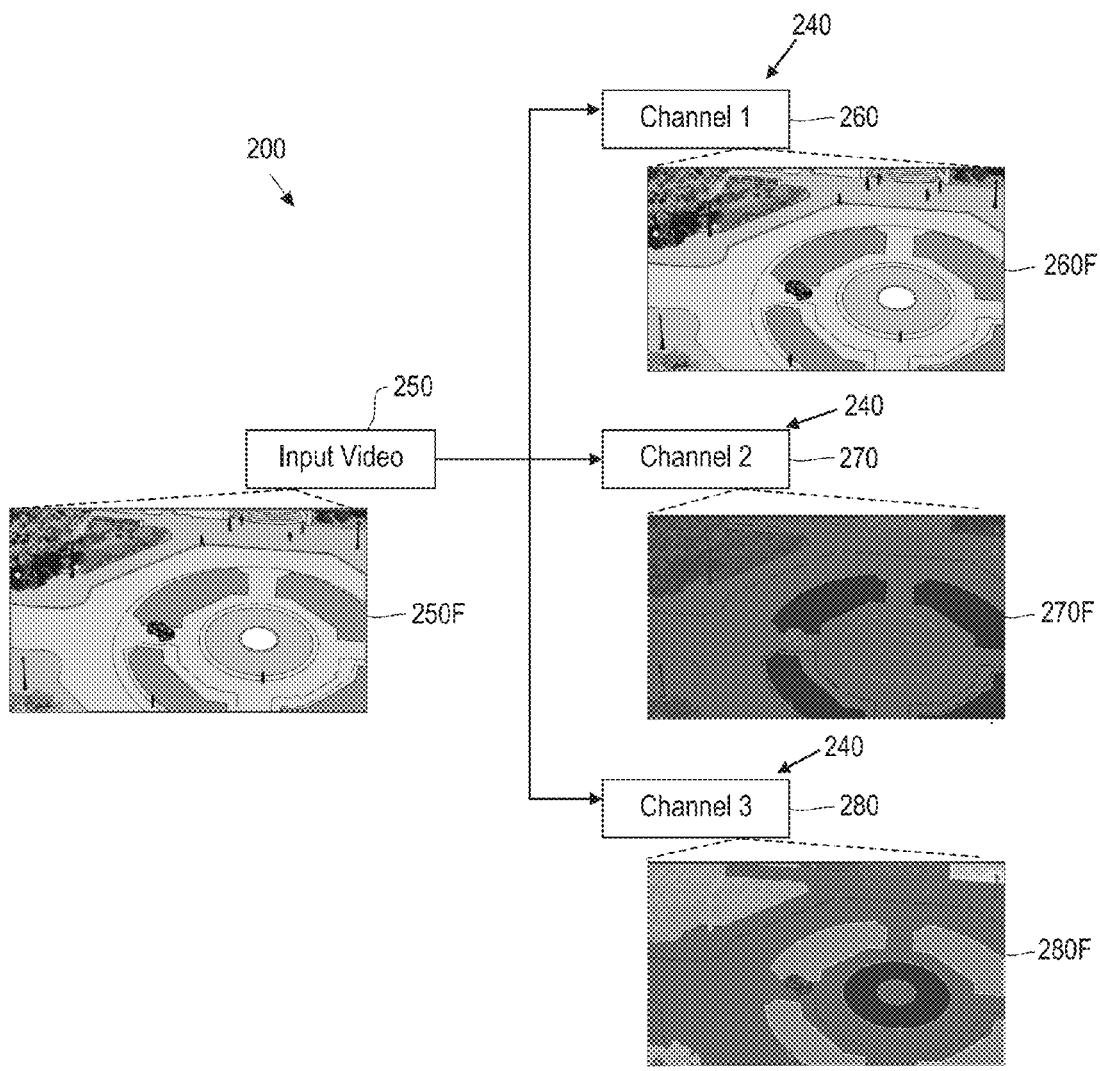
FIG. 6 illustrates pre-processing an input video for feature extraction, in accordance with an embodiment of the invention.

FIG. 6 illustrates pre-processing an input video 250 for feature extraction, in accordance with an embodiment of the invention. In one embodiment, the transducer unit 210 converts the input video 250 to a pre-determined color space. Specifically, the transducer unit 210 converts each image frame 250F of the input video 250 to one or more channels 240, wherein each channel corresponds to a dimension of a color space.

For example, in one embodiment, the input video 250 comprises a sequence of image frames 250F in the RGB color space, wherein each image frame 250F is a 1088×1920 pixel RGB image with 8 bits per channel (i.e., 8 bits for the R dimension of the RGB color space, 8 bits for the G dimension of the RGB color space, and 8 bits for the B dimension of the RGB color space). Each pixel of each image frame 250F has a corresponding pixel intensity value per channel (e.g., a pixel intensity value ranging from 0 to 255). The frame rate for the input video 250 is 30 frames per second.

The transducer unit 210 converts each image frame 250F of the input video 250 from the RGB color space to the L*a*b* color space. Specifically, the transducer unit 210 converts each image frame 250F to three separate channels 240: a first channel 260 ("Channel 1") corresponding to the L* dimension of the L*a*b* color space, a second channel 270 ("Channel 2") corresponding to the a* dimension of the L*a*b* color space, and a third channel 280 ("Channel 3") corresponding to the b* dimension of the L*a*b* color space. In another embodiment, the transducer unit 210 converts each image frame 250F to fewer than, or more than, three separate channels 240.

In one embodiment, the transducer unit 210 downsamples each image frame 250F of the input video 250. For example, the transducer unit 210 downsamples each image frame 250F from 1088×1920 pixels to 136×240 pixels.

As stated above, the transducer unit 210 converts each pixel of each image frame 250F of the input video 250 to one or more neuronal firing events. For example, the transducer unit 210 converts each pixel of each image frame 260F, 270F and 280F of Channel 1, Channel 2 and Channel 3, respectively, to neuronal firing events. Specifically, the transducer unit 210 converts a corresponding pixel intensity value for each pixel to a pre-determined number of bits.

In one embodiment, the transducer unit 210 converts a corresponding pixel intensity value for each pixel to 4-bits, thereby enabling each pixel to be represented as a rate code of between 0 to 15 neuronal firing events. The number of neuronal firing events for a pixel represents the 4-bit pixel intensity value for the pixel. Therefore, Channel 1 represents a sequence of image frames 260F for a 4-bit transduced video in the L* dimension, Channel 2 represents a sequence of image frames 270F for a 4-bit transduced video in the a* dimension, and Channel 3 represents a sequence of image frames 280F for a 4-bit transduced video in the b* dimension. In another embodiment, the transducer unit 210 converts a corresponding pixel intensity value for each pixel to fewer than, or more than, 4-bits.

For each channel of each image frame, a pixel intensity of each pixel of the channel is converted to neural spikes based on a temporal coding scheme and a spatial coding scheme.

In one embodiment, the temporal coding scheme is rate coding. In rate coding, each pixel of each image frame has a corresponding spike count based on a corresponding intensity value for the pixel, wherein the corresponding spike count represents the number of neural spikes delivered to one or more input lines for the pixel within a pre-determined time window. A corresponding intensity value for each pixel of each image frame is mapped to a corresponding spike count for the pixel based on one of a linear mapping and a non-linear mapping. A predetermined floor value or a predetermined ceiling value may used for mapping a corresponding intensity value for each pixel of each image frame is to a corresponding spike count for the pixel.

In another embodiment, the temporal coding scheme is stochastic coding. In stochastic coding, each pixel of each image frame has a corresponding spiking probability based on a corresponding intensity value for the pixel, wherein the corresponding spiking probability represents the probability that a neural spike is delivered to one or more input lines for the pixel in each time step. A corresponding intensity value for each pixel of each image frame is mapped to a corresponding spiking probability for the pixel based on one of a linear mapping and a non-linear mapping. A predetermined floor value or a predetermined ceiling value may be used for mapping a corresponding intensity value for each pixel of each image frame to a corresponding spiking probability for the pixel.

In one embodiment, the spatial coding scheme is single line coding. In single line coding, neural spikes for each pixel of each image frame are delivered to a single input line for the pixel.

In another embodiment, the spatial coding scheme is population coding. In population coding, neural spikes for each pixel of each image frame are delivered to multiple input lines for the pixel, wherein each input line of the multiple input lines is configured to encode values having one of a particular sign and a particular amplitude.

Figure 7:
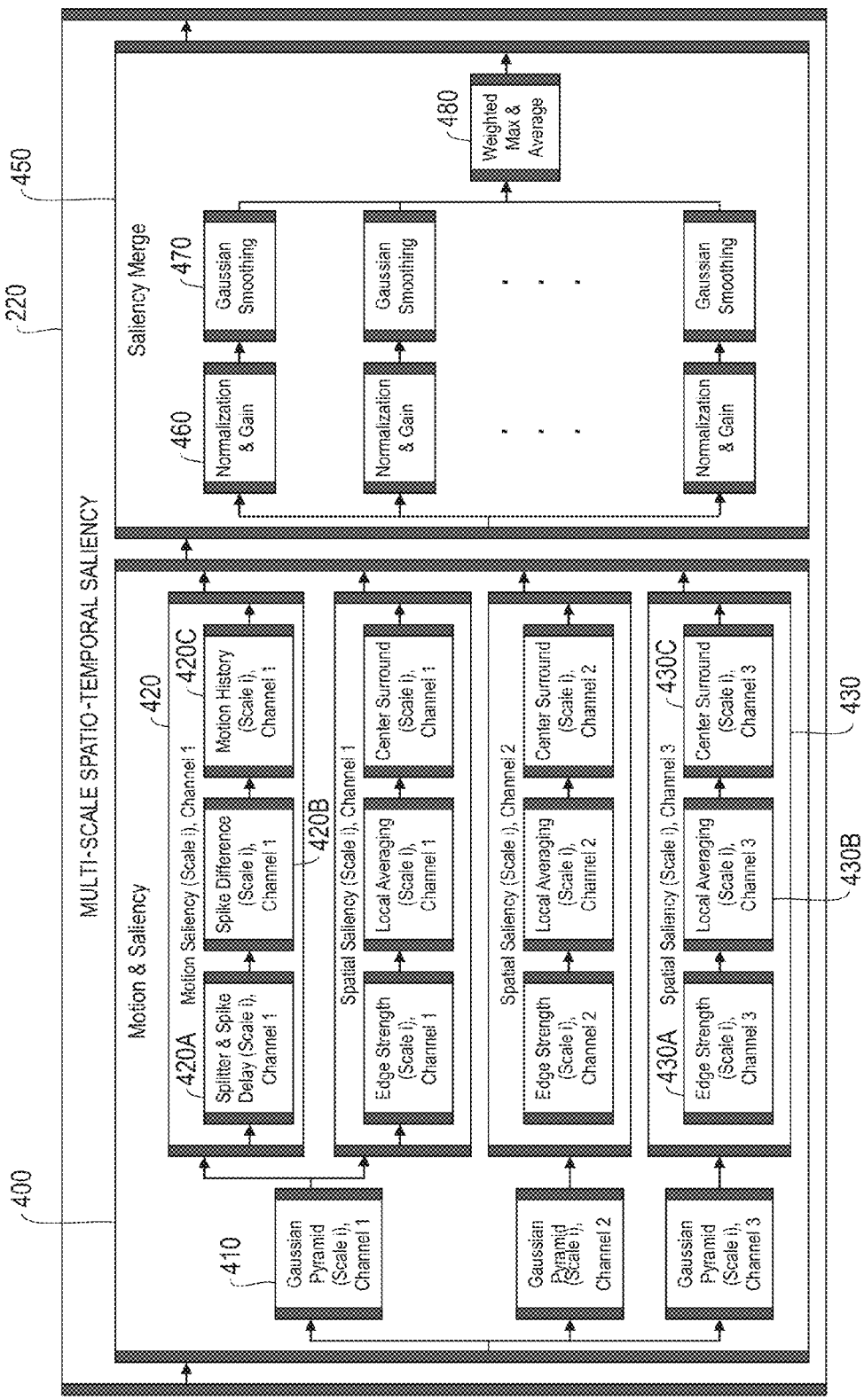
FIG. 7 illustrates an example multi-scale spatio-temporal saliency corelet, in accordance with an embodiment of the invention.

FIG. 7 illustrates an example multi-scale spatio-temporal saliency corelet 220, in accordance with an embodiment of the invention. The multi-scale spatio-temporal saliency corelet 220 comprises multiple corelets 100 for feature extraction. In one embodiment, the multi-scale spatio-temporal saliency corelet 220 comprises a motion and saliency corelet 400 for extracting motion saliency features and spatial saliency features from each image frame 250F of the input video 250. As shown in FIG. 7, the motion and saliency corelet 400 is itself a complex corelet 160 comprising multiple corelets 100.

In one embodiment, the motion and saliency corelet 400 comprises multiple Gaussian pyramid corelets 410. Each channel 240 has at least one corresponding Gaussian pyramid corelet 410 for generating a Gaussian pyramid 500 (FIG. 8A) of different scaled image frames (i.e., data layers). Specifically, for each image frame of each channel 240, a Gaussian pyramid 500 comprising the image frame and samples of the image frame are generated, wherein each sample represents a coarser-scaled version of the image frame. Let the term scale i generally denote a scale (i.e., data layer) represented by a Gaussian pyramid 500, wherein i is a positive integer. As shown in FIG. 7, each Channel 1, Channel 2 and Channel 3 has at least one corresponding Gaussian pyramid corelet 410 for generating an image frame of scale i.

The motion and saliency corelet 400 further comprises multiple motion saliency corelets 420 for extracting motion saliency features from the input video 250. Each motion saliency corelet 420 is used to detect regions of interest within the input video 250 where motion is detected (i.e., where abrupt changes occur after a brief period of time). An object recognition algorithm may then be applied to the detected regions to classify objects within the detected regions.

Specifically, the saliency system 200 extracts motion saliency features from image frames 260F of Channel 1. Each scale i of a Gaussian pyramid 500 for Channel 1 has a corresponding motion saliency corelet 420 for receiving an image frame of scale i generated by a Gaussian pyramid corelet 410, and extracting motion saliency features based on the image frame and adjacent image frames of scale i. Each motion saliency corelet 420 is a complex corelet 160 comprising a splitter and spike delay corelet 420A, a spike difference corelet 420B, and a motion history corelet 420C. The splitter and spike delay corelet 420A functions as a splitter by generating two copies of an image frame of scale i. In one embodiment, the splitter and spike delay corelet 420A utilizes 255 core units 10 for generating the two copies of the image frame. Each copy of the image frame is forwarded to the spike difference corelet 420B; however, the second copy of the image frame is delayed and forwarded only after a pre-determined period of time has elapsed (e.g., a few milliseconds). In one embodiment, the splitter and spike delay corelet 420A utilizes 128 core units 10 for delaying the second copy of the image frame.

In one embodiment, for each data layer (i.e., scale) of each multi-scale data structure (i.e., Gaussian pyramid) corresponding to each channel of each image frame 250F, a neural spiking representation outputted by the data layer is updated with each new image frame, and a retinotopic transformation between two maps of features extracted from the multi-scale data structure is applied to determine a diffeomorphic mapping between pixel coordinates of the two maps.

The spike difference corelet 420B receives a first image frame and a second image frame from the splitter and spike delay corelet 420A, wherein the second image frame is a time-delayed image frame that precedes the first image frame in the input video 250. The spike difference corelet 420B determines whether the absolute value of a difference in intensity between corresponding pixels in the first image frame and the second image frame exceeds a pre-determined (e.g., user-specified) threshold. If the pre-determined threshold is exceeded, this is interpreted to mean that motion has been detected in the corresponding pixel, and the corresponding neuron outputs a spike to indicate that motion has been detected. In one embodiment, the spike difference corelet 420B utilizes 389 core units 10. In one embodiment, the spike difference corelet 420B is power efficient, such that the spike difference corelet 420B generates a maximum of one neuronal firing event per pixel every 19 milliseconds.

Based on differences determined by the spike difference corelet 420B, the motion history corelet 420C tracks objects with non-uniform speeds in regions of interests where motion is detected. Each input axon 15 of the motion history corelet 420C is mapped to a unique output neuron 11. Each input spike received by each neuron 11 increases a membrane potential of the neuron by a pre-determined (e.g., user-specified) threshold. For each neuron, a membrane potential of the neuron is decreased during each time step, wherein the minimum value that the membrane potential may be equal to is zero. Each neuron 11 fires a single output spike with a probability that is proportional to a membrane potential of the neuron. Therefore, a neuron is more likely to fire an output spike if a membrane potential of the neuron is high (e.g., the neuron 11 is more likely to generate an output spike if an input axon 15 mapped to the neuron 11 recently received many input spikes). In one embodiment, the motion history corelet 420C utilizes 128 core units 10 including neurons 11 that operate stochastically.

The motion and saliency corelet 400 further comprises multiple spatial saliency corelets 430 for extracting spatial saliency features from the input video 250. The spatial saliency corelets 430 complement the motion saliency corelets 420. Specifically, the spatial saliency corelets 430 are used to detect regions of interest in the input video 250 that are not detected by the motion saliency corelets 420 (e.g., motionless regions of interest). In one embodiment, the input video 250 represents video captured from a coordinate frame that is in motion (e.g., vision sensors mounted on a moving object).

Specifically, the saliency system 200 extracts spatial saliency features from each individual image frame 260F, 270F and 280F of Channel 1, Channel 2 and Channel 3, respectively. Each scale i of each Gaussian pyramid 500 for each channel 240 has a corresponding spatial saliency corelet 430 for receiving an image frame of scale i generated by a Gaussian pyramid corelet 410, and extracting spatial saliency features based on the image frame. Each spatial saliency corelet 430 is a complex corelet 160 comprising an edge strength corelet 430A, a local averaging corelet 430B, and a center surround corelet 430C.

An edge strength corelet 430A estimates, in real-time, the strength of edges ("edge strength") within an image frame from a channel 240. In one embodiment, the edge strength corelet 430A calculates the gradient of the image frame based on partial derivates along an x-axis and y-axis of the image frame. The saliency system 200 determines the edge strength within each image frame from each channel 240, and fuses the edge strengths determined through a BUS-OR operation to generate anywhere between 0 to 15 neuronal firing events for each pixel, wherein the neuronal firing events generated indicate the edge strength of an edge at the pixel.

A local averaging corelet 430B calculates a mean edge strength at each pixel. In one embodiment, the local averaging corelet 430B calculates a mean edge strength for a patch of pixels within an image frame. In one embodiment, the size of the patch is based on a pre-determined size parameter (e.g., 5×5 pixels). In one embodiment, the local averaging corelet 430B is efficient in terms of the number of neurons 11. In one embodiment, all core units 10 utilized by the local averaging corelet 430B are synchronized. In one embodiment, all core units 10 may calculate the local average number of neuronal firing events regardless of the order in which the neuronal firing events arrive at the local averaging corelet 430B. In one embodiment, a maximum of 15 neuronal firing events per pixel arrive at the local averaging corelet 430B.

In one embodiment, one core unit 10 is utilized for calculating a mean edge strength for each pixel in a patch of pixels, wherein the patch has dimensions no larger than 16×16. For each pixel in the patch, a mean pixel intensity in a 5×5 neighborhood is calculated. Partial results from neighboring pixels that are mapped to different cores may need to be fused. If a resetting of the membrane potential is required at the end of each frame, then at least one axon 15 on the core unit 10 is necessary for resetting each neuron's membrane potential to zero.

A center surround corelet 430C applies a center surround operator to each pixel of an image frame from a channel 240. The center surround corelet 430C generates a single neuronal firing event for a pixel if it determines that a corresponding membrane potential exceeds a pre-determined threshold.

As stated above, the synchronization unit 230 generates periodic control pulses for synchronizing the corelets 100 of the multi-scale spatio-temporal saliency corelet 220. Synchronizing the corelets 100 in turn synchronizes the neuronal firing events generated by neurons 11 of the corelets 100. In one embodiment, the synchronized neuronal firing events may be used to reset the neurons 11 in preparation for a next image frame. In one embodiment, the synchronized neuronal firing events may be used to indicate when to sample a membrane potential in order to force the generation of a neuronal firing event if the membrane potential is above a pre-determined (e.g., user specified) threshold. In one embodiment, the synchronized neuronal firing events may be used to bias a membrane potential to provide more accurate calculations (e.g., rounding).

In one embodiment, periodic spikes are generated using periodically spiking neurons. The periodic spikes are distributed to axons of a neurosynaptic circuit. The periodic spikes represents period control pulses/signals for synchronizing a subset of the neurons at periodic intervals, and synchronizing the subset comprises one of the following: resetting a membrane potential of each neuron of the subset to a pre-determined membrane potential value, biasing a membrane potential of each neuron of the subset, and probing each neuron of the subset to output an output spike based on a corresponding neuronal function and all input spikes received by the neuron in a current interval. In one embodiment, a periodic interval corresponds to one of the following: an end of an image frame, a beginning of an image frame, and an interval from a beginning of a current image frame up to and including a clock tick before the periodic spikes are distributed to the axons of the neurosynaptic circuit. In one embodiment, each neuron incorporates an extra parameter specifying a number of clock ticks during which any output spike outputted by the neuron is suppressed.

The motion and saliency corelet 400 further comprises a saliency merge corelet 450 for fusing all saliency maps generated by the motion and saliency corelet 400. As shown in FIG. 7, the saliency merge corelet 450 is itself a complex corelet 160 comprising multiple corelets 100.

In one embodiment, the saliency merge corelet 450 comprises multiple normalization and gain corelets 460. A normalization and gain corelet 460 normalizes resolution of a saliency map by routing neuronal firing events of each input pixel/axon to one or more output pixels/neurons, wherein the number of input and output pixels need not be identical. Each neuron does not generate a spike if there are no input spikes in any of the input pixels that are mapped to this output pixel. Otherwise, if there is at least one input spike in one of the input pixels that are mapped to the output pixel, a user-specified number of spikes are output (e.g., the gain of the input). Each scale i of each Gaussian pyramid 500 for each channel 240 has a corresponding normalization and gain corelet 460 for normalizing a saliency map generated by a motion saliency corelet 420 or spatial saliency corelet 430.

In one embodiment, for each data layer (i.e., scale) of each multi-scale data structure (i.e., Gaussian pyramid) corresponding to each channel of each image frame 250F, a convolution of neural spiking data corresponding to the channel is determined by convolving the neural spiking data with a two-dimensional smoothing kernel, wherein the convolution is determined using a set of spiking neurons corresponding to the data layer, and wherein a neural spiking representation outputted by the data layer represents a spatial subsampling of the convolution.

For example, the saliency merge corelet 450 further comprises multiple Gaussian smoothing corelets 470. A Gaussian smoothing corelet 470 applies a Gaussian smoothing operator to a saliency map to suppress speckles and enhance centers indicating salient features. Each scale i of each Gaussian pyramid 500 for each channel 240 has a corresponding Gaussian smoothing corelet 470 for applying the Gaussian smoothing operator to a saliency map generated by a motion saliency corelet 420 or spatial saliency corelet 430.

The saliency merge corelet 450 further comprises a weighted maximum and average corelet 480. The weighted maximum and average corelet 480 merges the saliency maps generated. Specifically, the weighted maximum and average corelet 480 determines, for each channel 240, a corresponding weighted maximum of all saliency maps generated for the channel 240. The weighted maximum and average corelet 480 then determines a weighted average based on each weighted maximum for each channel 240, and generates a fused saliency map based on the weighted average.

In one embodiment, one or more features are extracted from each data layer of each multi-scale data structure using a neural network including one or more neurons. Each neuron of the neural network receives input via one or more weighted incoming lines, wherein, for each neural spike delivered to each input line, a neuron of the neural network receives the neural spike via a weighted incoming line, and the neuron integrates a weight corresponding to the weighted incoming line as input. Each neuron generates one or more outgoing neural spikes based on an activation function and input integrated by the neuron. Each input received by each neuron represents input from one of the following: an external source, and at least other neuron of the neural network. The neurons include a set of neurons representing output, wherein outgoing neural spikes generated by the set of neurons encode the one or more extracted features. Each neuron generates an outgoing neural spike when input integrated by the neuron exceeds a pre-determined threshold.

The neural network further includes a synaptic crossbar array for interconnecting the neurons. The array includes one or more axons, one or more dendrite, and one or more weighted synaptic connections interconnecting the axons with the dendrites. Each axon of the array is an input line that one or more neural spikes are delivered to. Each dendrite of the array is a weighted incoming line that delivers one or more weighted neural spikes to a particular neuron of the neural network. In one embodiment, the weighted synaptic connections are binary. Each neuron assigns a weight to an incoming neural spike based on an axon that the incoming neural spike was delivered to.

In one embodiment, the features extracted comprise at least one of the following: one or more mathematically defined features, and one or more learned features. The mathematically defined feature include at least one of the following: one or more edge extraction operators operating on luminance and color channels, one or more texture extraction operators for extracting high frequency spatial activity, and one or more local averaging operations. The one or more learned features include at least one feature learned from training data using one or more of the following algorithms: k-means clustering, and input/desired output covariance.

Figure 8A:
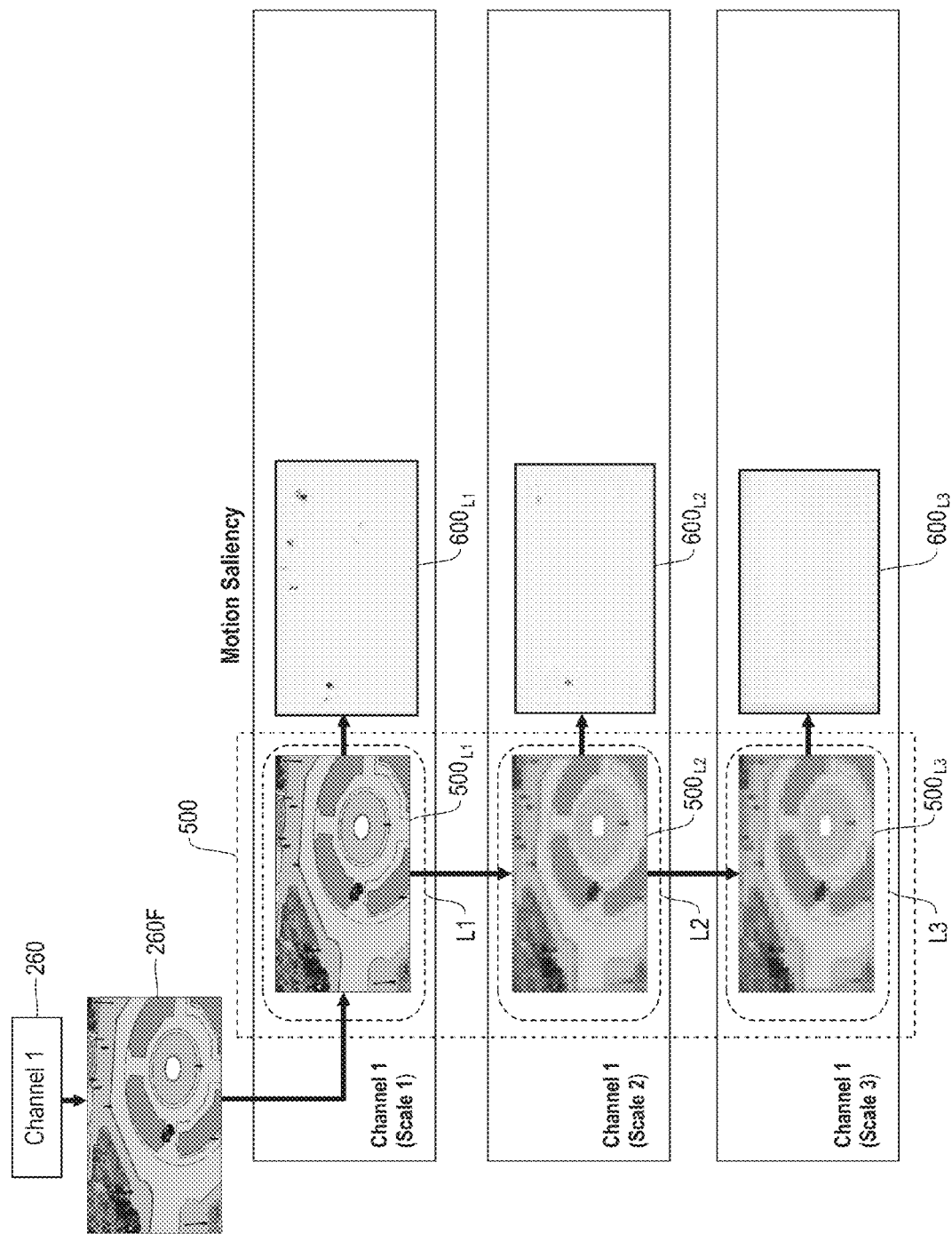
FIG. 8A illustrates extracting motion saliency features, in accordance with an embodiment of the invention.

FIG. 8A illustrates extracting motion saliency features, in accordance with an embodiment of the invention. In one embodiment, a Gaussian pyramid 500 comprises three layers, wherein each layer comprises an image frame scaled differently from an image frame in another layer. As shown in FIG. 8A, the Gaussian pyramid comprises a first layer L1 comprising a first image frame $500_{L1}$ of scale 1, a second layer L2 comprising a second image frame $500_{L2}$ of scale 2, and a third layer L3 comprising a third image frame $500_{L3}$ of scale 3. The first image frame $500_{L1}$ is finer-scaled than the second image frame $500_{L2}$ and the third image frame $500_{L3}$ (i.e., the second image frame $500_{L2}$ and the third image frame $500_{L3}$ are coarser-scaled than the first image frame $500_{L1}$). The second image frame $500_{L2}$ is finer-scaled than the third image frame $500_{L3}$ (i.e., the third image frame $500_{L3}$ is coarser-scaled than the second image frame $500_{L1}$).

As stated above, the saliency system 200 extracts motion saliency features from image frames 260F from Channel 1. Specifically, each scale i of the Gaussian pyramid 500 for Channel 1 has a corresponding motion saliency corelet 420 for extracting motion saliency features based on an image frame of scale i and adjacent image frames of scale i, and generating a saliency map representing the extracted motion saliency features.

For example, each layer L1, L2 and L3 of the Gaussian pyramid 500 in FIG. 8A has a corresponding motion saliency corelet 420. A corresponding motion saliency corelet 420 for layer L1 generates a first saliency map $600_{L1}$ representing extracted motion saliency features based on the first image frame $500_{L1}$. A corresponding motion saliency corelet 420 for layer L2 generates a second saliency map $600_{L2}$ representing extracted motion saliency features based on the second image frame $500_{L2}$. A corresponding motion saliency corelet 420 for layer L3 generates a third saliency map $600_{L3}$ representing extracted motion saliency features based on the third image frame $500_{L3}$.

Figure 8B:
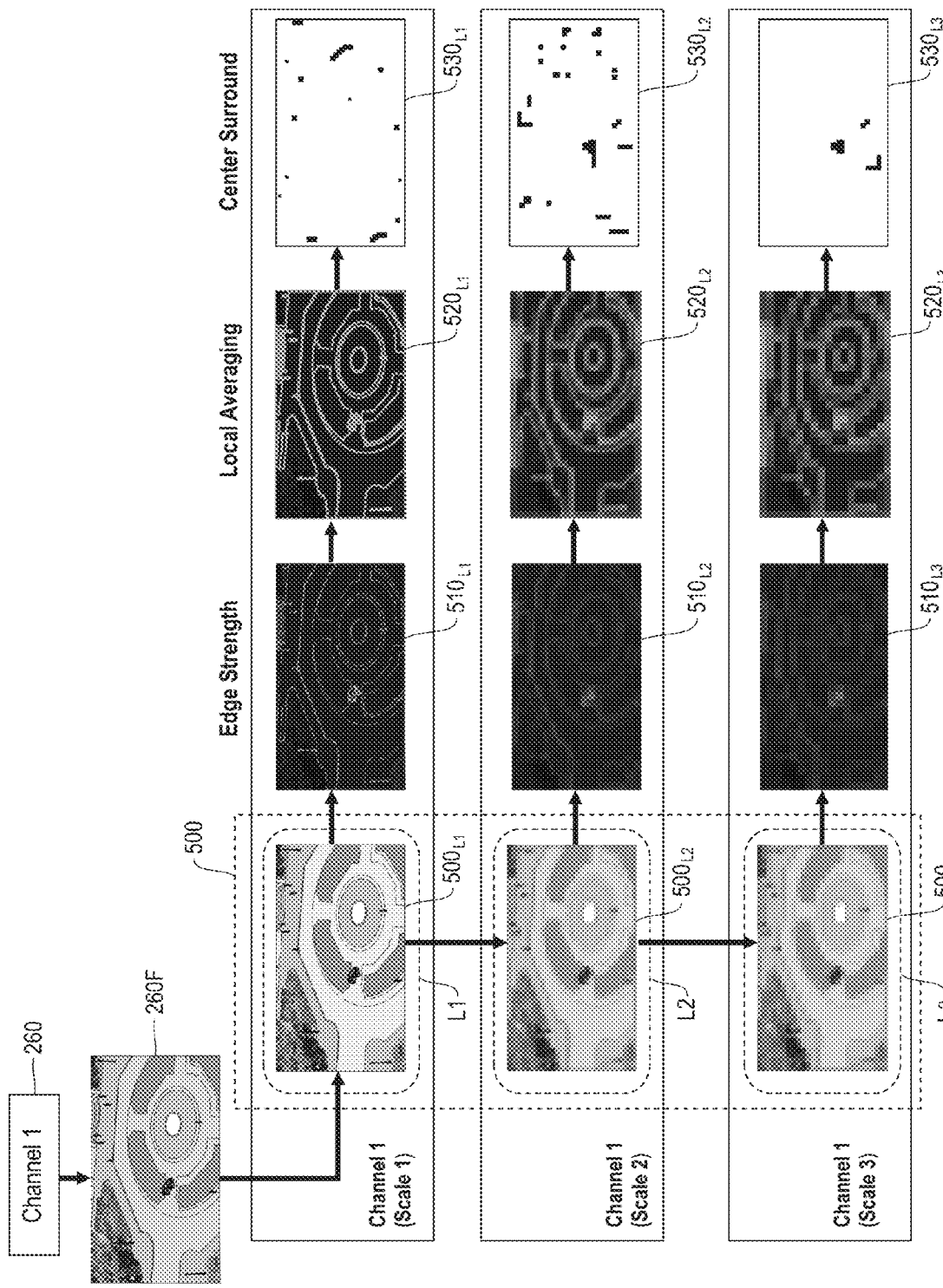
FIG. 8B illustrates extracting spatial saliency features for a first channel, in accordance with an embodiment of the invention.

FIG. 8B illustrates extracting spatial saliency features for a first channel, in accordance with an embodiment of the invention. As stated above, the saliency system 200 extracts spatial saliency features from each image frame 260F, 270F and 280F from each Channel 1, Channel 2 and Channel 3, respectively. In one embodiment, each scale i of a Gaussian pyramid 500 for Channel 1 has a corresponding spatial saliency corelet 430 for extracting spatial saliency features based on an image frame of scale i, and generating a saliency map representing the extracted saliency features.

For example, each layer L1, L2 and L3 of the Gaussian pyramid 500 in FIG. 8B has a corresponding spatial saliency corelet 430. A corresponding spatial saliency corelet 430 for layer L1 first generates a saliency map $510_{L1}$ representing edge strength of the first image frame $500_{L1}$. Based on the saliency map $510_{L1}$, the corresponding spatial saliency corelet 430 for layer L1 generates another saliency map $520_{L1}$ representing mean average edge strength of the first image frame $500_{L1}$. The corresponding spatial saliency corelet 430 for layer L1 then applies a center surround operation to the saliency map 520l1, and generates another saliency map $530_{L1}$ representing center surround of the first image frame $500_{L1}$.

A corresponding spatial saliency corelet 420 for layer L2 first generates a saliency map $510_{L2}$ representing edge strength of the second image frame $500_{L2}$. Based on the saliency map $510_{L2}$, the corresponding spatial saliency corelet 420 for layer L2 generates another saliency map $520_{L2}$ representing mean average edge strength of the second image frame $500_{L2}$. The corresponding spatial saliency corelet 420 for layer L2 then applies a center surround operation to the saliency map $520_{L2}$, and generates another saliency map $530_{L2}$ representing center surround of the second image frame $500_{L2}$.

A corresponding spatial saliency corelet 420 for layer L3 first generates a saliency map $510_{L3}$ representing edge strength of the third image frame $500_{L3}$. Based on the saliency map $510_{L3}$, the corresponding spatial saliency corelet 420 for layer L3 generates another saliency map $520_{L3}$ representing mean average edge strength of the third image frame $500_{L3}$. The corresponding spatial saliency corelet 420 for layer L3 then applies a center surround operation to the saliency map $520_{L3}$, and generates another saliency map $530_{L3}$ representing center surround of the third image frame $500_{L3}$.

FIG. 8C illustrates extracting spatial saliency features for a second channel, in accordance with an embodiment of the invention. In one embodiment, each scale i of a Gaussian pyramid 700 for Channel 2 has a corresponding spatial saliency corelet 430 for extracting spatial saliency features based on an image frame of scale i, and generating a saliency map representing the extracted saliency features.

For example, each layer L1, L2 and L3 of the Gaussian pyramid 700 in FIG. 8C has a corresponding spatial saliency corelet 430. A corresponding spatial saliency corelet 430 for layer L1 first generates a saliency map $710_{L1}$ representing edge strength of the first image frame $700_{L1}$. Based on the saliency map $710_{L1}$, the corresponding spatial saliency corelet 430 for layer L1 generates another saliency map $720_{L1}$ representing mean average edge strength of the first image frame $700_{L1}$. The corresponding spatial saliency corelet 430 for layer L1 then applies a center surround operation to the saliency map $720_{L1}$, and generates another saliency map $730_{L1}$ representing center surround of the first image frame $700_{L1}$.

A corresponding spatial saliency corelet 420 for layer L2 first generates a saliency map $710_{L2}$ representing edge strength of the second image frame $700_{L2}$. Based on the saliency map $710_{L2}$, the corresponding spatial saliency corelet 420 for layer L2 generates another saliency map $720_{L2}$ representing mean average edge strength of the second image frame $700_{L2}$. The corresponding spatial saliency corelet 420 for layer L2 then applies a center surround operation to the saliency map $720_{L2}$, and generates another saliency map $730_{L2}$ representing center surround of the second image frame $700_{L2}$.

A corresponding spatial saliency corelet 420 for layer L3 first generates a saliency map $710_{L3}$ representing edge strength of the third image frame $700_{L3}$. Based on the saliency map $710_{L3}$, the corresponding spatial saliency corelet 420 for layer L3 generates another saliency map $720_{L3}$ representing mean average edge strength of the third image frame $700_{L3}$. The corresponding spatial saliency corelet 420 for layer L3 then applies a center surround operation to the saliency map $720_{L3}$, and generates another saliency map $730_{L3}$ representing center surround of the third image frame $700_{L3}$.

Figure 8D:
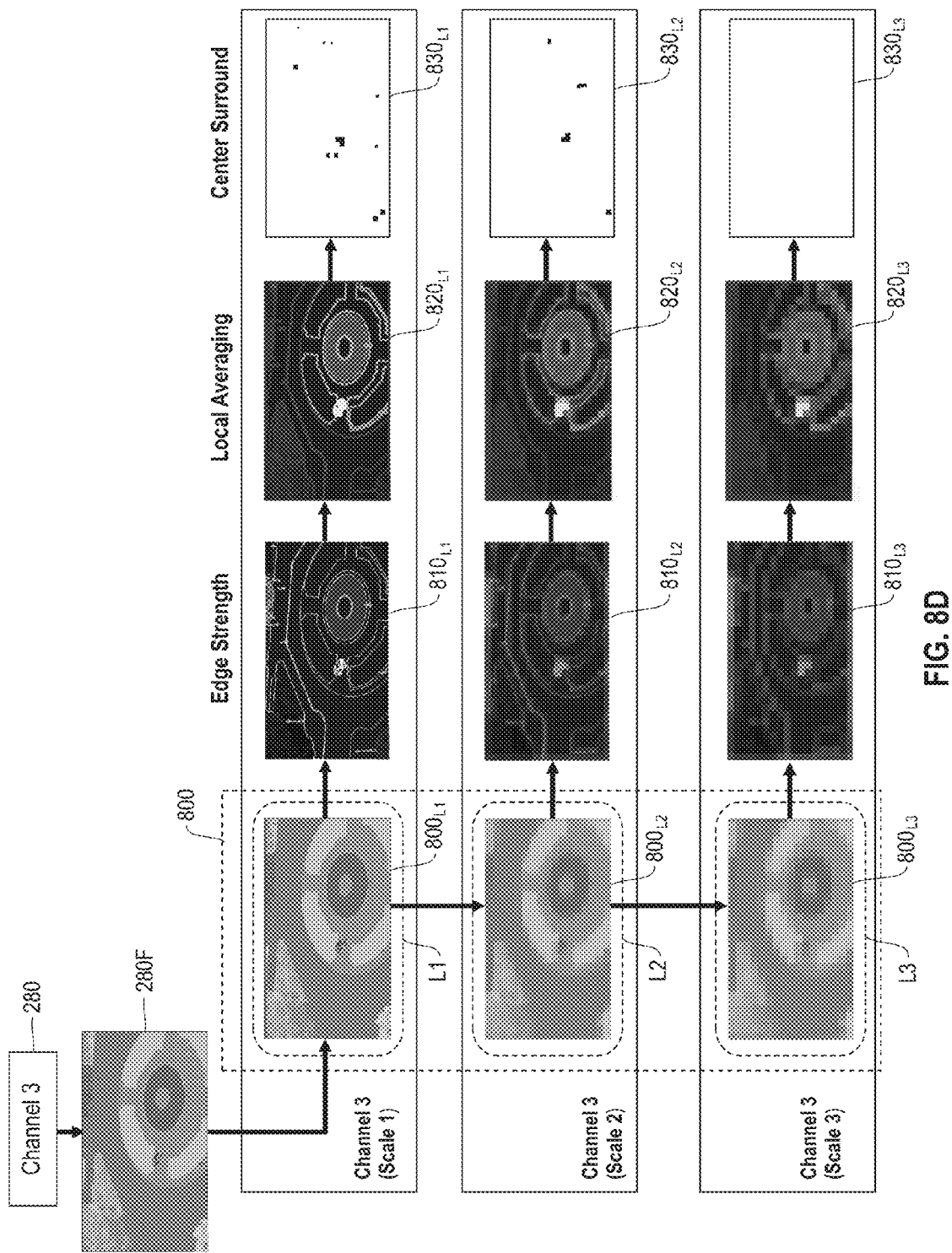
FIG. 8D illustrates extracting spatial saliency features for a third channel, in accordance with an embodiment of the invention

FIG. 8D illustrates extracting spatial saliency features for a third channel, in accordance with an embodiment of the invention. In one embodiment, each scale i of a Gaussian pyramid 800 for Channel 3 has a corresponding spatial saliency corelet 430 for extracting spatial saliency features based on an image frame of scale i, and generating a saliency map representing the extracted saliency features.

For example, each layer L1, L2 and L3 of the Gaussian pyramid 800 in FIG. 8D has a corresponding spatial saliency corelet 430. A corresponding spatial saliency corelet 430 for layer L1 first generates a saliency map $810_{L1}$ representing edge strength of the first image frame $800_{L1}$. Based on the saliency map $810_{L1}$, the corresponding spatial saliency corelet 430 for layer L1 generates another saliency map $820_{L1}$ representing mean average edge strength of the first image frame $800_{L1}$. The corresponding spatial saliency corelet 430 for layer L1 then applies a center surround operation to the saliency map $820_{L1}$, and generates another saliency map $830_{L1}$ representing center surround of the first image frame $800_{L1}$.

A corresponding spatial saliency corelet 420 for layer L2 first generates a saliency map $810_{L2}$ representing edge strength of the second image frame $800_{L2}$. Based on the saliency map $810_{L2}$, the corresponding spatial saliency corelet 420 for layer L2 generates another saliency map $820_{L2}$ representing mean average edge strength of the second image frame $800_{L2}$. The corresponding spatial saliency corelet 420 for layer L2 then applies a center surround operation to the saliency map $820_{L2}$, and generates another saliency map $830_{L2}$ representing center surround of the second image frame $800_{L2}$.

A corresponding spatial saliency corelet 420 for layer L3 first generates a saliency map $810_{L3}$ representing edge strength of the third image frame $800_{L3}$. Based on the saliency map $810_{L3}$, the corresponding spatial saliency corelet 420 for layer L3 generates another saliency map $820_{L3}$ representing mean average edge strength of the third image frame $800_{L3}$. The corresponding spatial saliency corelet 420 for layer L3 then applies a center surround operation to the saliency map $820_{L3}$, and generates another saliency map $830_{L3}$ representing center surround of the third image frame $800_{L3}$.

Figure 9:
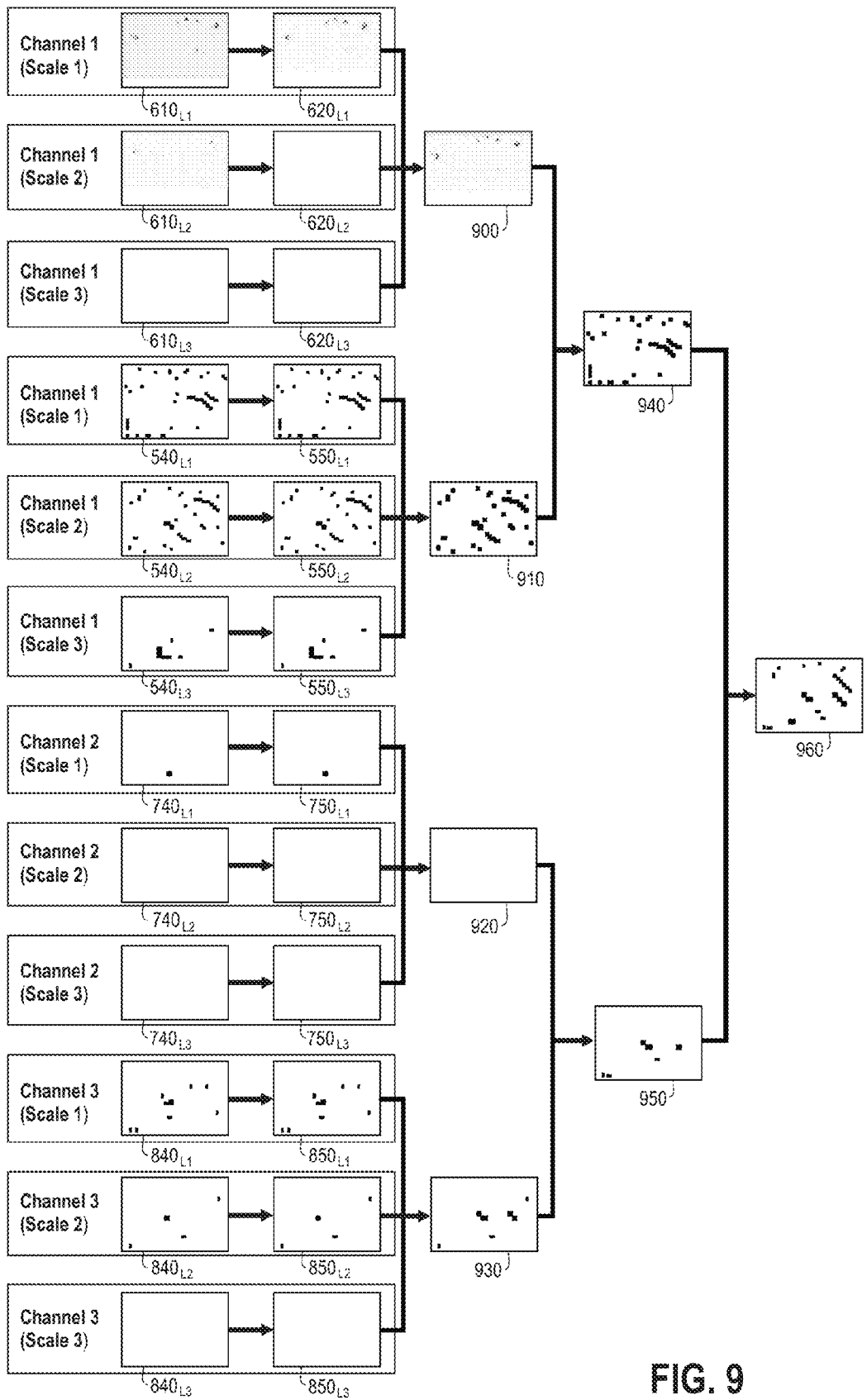
FIG. 9 illustrates fusing multiple saliency maps, in accordance with an embodiment of the invention.

FIG. 9 illustrates fusing multiple saliency maps, in accordance with an embodiment of the invention. As stated above, the saliency merge corelet 450 comprises multiple normalization and gain corelets 460, and multiple Gaussian smoothing corelets 470. In one embodiment, each scale i of each Gaussian pyramid 500, 700 and 800 corresponding to Channel 1, Channel 2 and Channel 3, respectively, has a corresponding normalization and gain corelet 460 for normalizing a saliency map. Each scale i of each Gaussian pyramid 500, 700 and 800 corresponding to Channel 1, Channel 2 and Channel 3, respectively, also has a corresponding Gaussian smoothing corelet 470 for applying a Gaussian smoothing operation to a saliency map.

For example, each layer L1, L2 and L3 of the Gaussian pyramid 500 corresponding to Channel 1 has at least one corresponding normalization and gain corelet 460 and at least one corresponding Gaussian smoothing corelet 470. Specifically, a first normalization and gain corelet 460 for layer L1 generates, based on the saliency map $600_{L1}$, a saliency map $610_{L1}$ representing a normalization of the motion saliency features extracted from the image frame $500_{L1}$. A first corresponding Gaussian smoothing corelet 470 for layer L1 then applies a Gaussian smoothing operation to the saliency map $610_{L1}$ to generate another saliency map $620_{L1}$ with suppressed speckles and enhanced centers. A second normalization and gain corelet 460 for layer L1 generates, based on the saliency map $530_{L1}$, a saliency map $540_{L1}$ representing a normalization of the spatial saliency features extracted from the image frame $500_{L1}$. A second corresponding Gaussian smoothing corelet 470 for layer L1 then applies a Gaussian smoothing operation to the saliency map 54011 to generate another saliency map $550_{L1}$ with suppressed speckles and enhanced centers.

Similarly, a first normalization and gain corelet 460 for layer L2 generates, based on the saliency map $600_{L2}$, a saliency map $610_{L2}$ representing a normalization of the motion saliency features extracted from the image frame $500_{L2}$. A first corresponding Gaussian smoothing corelet 470 for layer L2 then applies a Gaussian smoothing operation to the saliency map $610_{L2}$ to generate another saliency map $620_{L2}$ with suppressed speckles and enhanced centers. A second normalization and gain corelet 460 for layer L2 generates, based on the saliency map $530_{L2}$, a saliency map $540_{L2}$ representing a normalization of the spatial saliency features extracted from the image frame $500_{L2}$. A second corresponding Gaussian smoothing corelet 470 for layer L2 then applies a Gaussian smoothing operation to the saliency map $540_{L2}$ to generate another saliency map $550_{L2}$ with suppressed speckles and enhanced centers.

Similarly, a first normalization and gain corelet 460 for layer L3 generates, based on the saliency map $600_{L3}$, a saliency map $610_{L3}$ representing a normalization of the motion saliency features extracted from the image frame $500_{L3}$. A first corresponding Gaussian smoothing corelet 470 for layer L3 then applies a Gaussian smoothing operation to the saliency map $610_{L3}$ to generate another saliency map $620_{L3}$ with suppressed speckles and enhanced centers. A second normalization and gain corelet 460 for layer L3 generates, based on the saliency map $530_{L3}$, a saliency map $540_{L3}$ representing a normalization of the spatial saliency features extracted from the image frame $500_{L3}$. A second corresponding Gaussian smoothing corelet 470 for layer L3 then applies a Gaussian smoothing operation to the saliency map $540_{L3}$ to generate another saliency map $550_{L3}$ with suppressed speckles and enhanced centers.

Each layer L1, L2 and L3 of the Gaussian pyramid 700 corresponding to Channel 2 has a corresponding normalization and gain corelet 460 and a corresponding Gaussian smoothing corelet 470. Specifically, a normalization and gain corelet 460 for layer L1 generates, based on the saliency map $730_{L1}$, a saliency map $740_{L1}$ representing a normalization of the spatial saliency features extracted from the image frame $700_{L1}$. A corresponding Gaussian smoothing corelet 470 for layer L1 then applies a Gaussian smoothing operation to the saliency map $740_{L1}$ to generate another saliency map $750_{L1}$ with suppressed speckles and enhanced centers.

Similarly, a normalization and gain corelet 460 for layer L2 generates, based on the saliency map $730_{L2}$, a saliency map $740_{L2}$ representing a normalization of the spatial saliency features extracted from the image frame $700_{L2}$. A corresponding Gaussian smoothing corelet 470 for layer L2 then applies a Gaussian smoothing operation to the saliency map $740_{L2}$ to generate another saliency map $750_{L2}$ with suppressed speckles and enhanced centers.

Similarly, a normalization and gain corelet 460 for layer L3 generates, based on the saliency map $730_{L3}$, a saliency map $740_{L3}$ representing a normalization of the spatial saliency features extracted from the image frame $700_{L3}$. A corresponding Gaussian smoothing corelet 470 for layer L3 then applies a Gaussian smoothing operation to the saliency map $740_{L3}$ to generate another saliency map $750_{L3}$ with suppressed speckles and enhanced centers.

Each layer L1, L2 and L3 of the Gaussian pyramid 800 corresponding to Channel 3 has a corresponding normalization and gain corelet 460 and a corresponding Gaussian smoothing corelet 470. Specifically, a normalization and gain corelet 460 for layer L1 generates, based on the saliency map $830_{L1}$, a saliency map $840_{L1}$ representing a normalization of the spatial saliency features extracted from the image frame $800_{L1}$. A corresponding Gaussian smoothing corelet 470 for layer L1 then applies a Gaussian smoothing operation to the saliency map $840_{L1}$ to generate another saliency map $850_{L1}$ with suppressed speckles and enhanced centers.

Similarly, a normalization and gain corelet 460 for layer L2 generates, based on the saliency map $830_{L2}$, a saliency map $840_{L2}$ representing a normalization of the spatial saliency features extracted from the image frame $800_{L2}$. A corresponding Gaussian smoothing corelet 470 for layer L2 then applies a Gaussian smoothing operation to the saliency map $840_{L2}$ to generate another saliency map $850_{L2}$ with suppressed speckles and enhanced centers.

Similarly, a normalization and gain corelet 460 for layer L3 generates, based on the saliency map $830_{L3}$, a saliency map $840_{L3}$ representing a normalization of the spatial saliency features extracted from the image frame $800_{L3}$. A corresponding Gaussian smoothing corelet 470 for layer L3 then applies a Gaussian smoothing operation to the saliency map $840_{L3}$ to generate another saliency map $850_{L3}$ with suppressed speckles and enhanced centers.

As stated above, the saliency merge corelet 450 further comprises a weighted max and average corelet 480. For each channel 240, the weighted max and average corelet 480 generates a corresponding saliency map representing a weighted maximum. For example, in one embodiment, the weighted max and average corelet 480 generates, based on the saliency maps $620_{L1}$, $620_{L2}$ and $620_{L3}$, a saliency map 900 representing a weighted maximum of motion saliency features extracted from image frames 260F of Channel 1. The weighted max and average corelet 480 further generates, based on the saliency maps $550_{L1}$, $550_{L2}$ and $550_{L3}$, a saliency map 910 representing a weighted maximum of spatial saliency features extracted from image frames 260F of Channel 1. The weighted max and average corelet 480 further generates, based on the saliency maps $750_{L1}$, $750_{L2}$ and $750_{L3}$, a saliency map 920 representing a weighted maximum of spatial saliency features extracted from image frames 270F of Channel 2. The weighted max and average corelet 480 further generates, based on the saliency maps $850_{L1}$, $850_{L2}$ and $850_{L3}$, a saliency map 930 representing a weighted maximum of spatial saliency features extracted from image frames 280F of Channel 3.

The weighted max and average corelet 480 then generates one or more weighted average maps based on the saliency maps representing weighted maximums. For example, in one embodiment, the weighted max and average corelet 480 generates a first weighted average map 940 representing the weighted average of the saliency maps 900 and 910. The weighted max and average corelet 480 generates a second weighted average map 950 representing the weighted average of the saliency maps 920 and 930. The weighted max and average corelet 480 generates a final weighted average map 960 representing the weighted average of the saliency maps 940 and 950.

Figure 10:
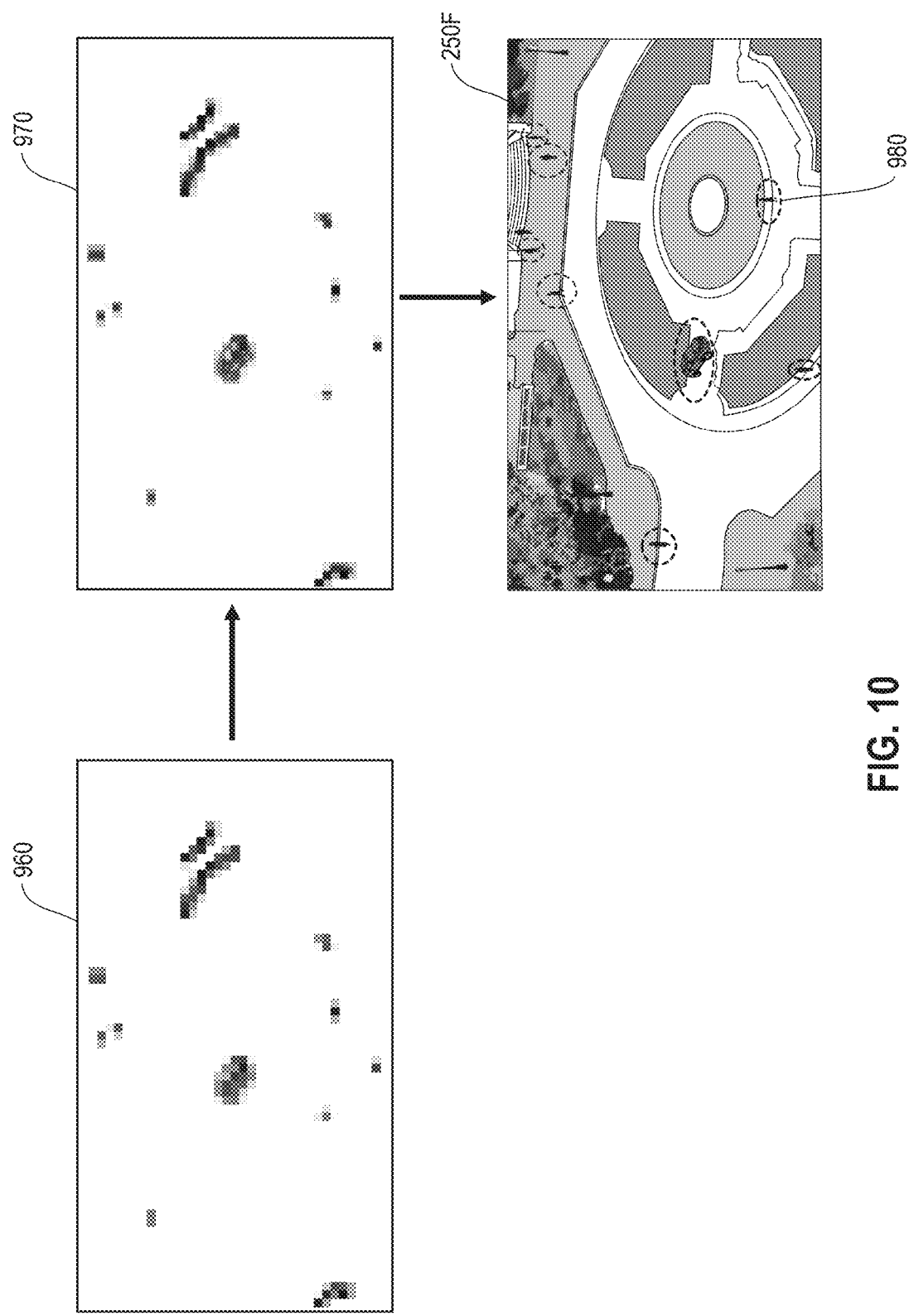
FIG. 10 illustrates detected regions of interest, in accordance with an embodiment of the invention.

FIG. 10 illustrates detected regions of interest, in accordance with an embodiment of the invention. Based on the final weighted average map 960, the weighted max and average corelet 480 generates a fused saliency map 970 representing extracted motion saliency features and spatial saliency features. The extracted salient features represent regions of interest 980 within the input video 250. For example, FIG. 10 illustrates a fused saliency map 970 corresponding to an image frame 250F. FIG. 10 further illustrates multiple regions of interest 980 within the image frame 250F, wherein each region of interest corresponds to one or more salient features represented in the fused saliency map 970.

Figure 11:
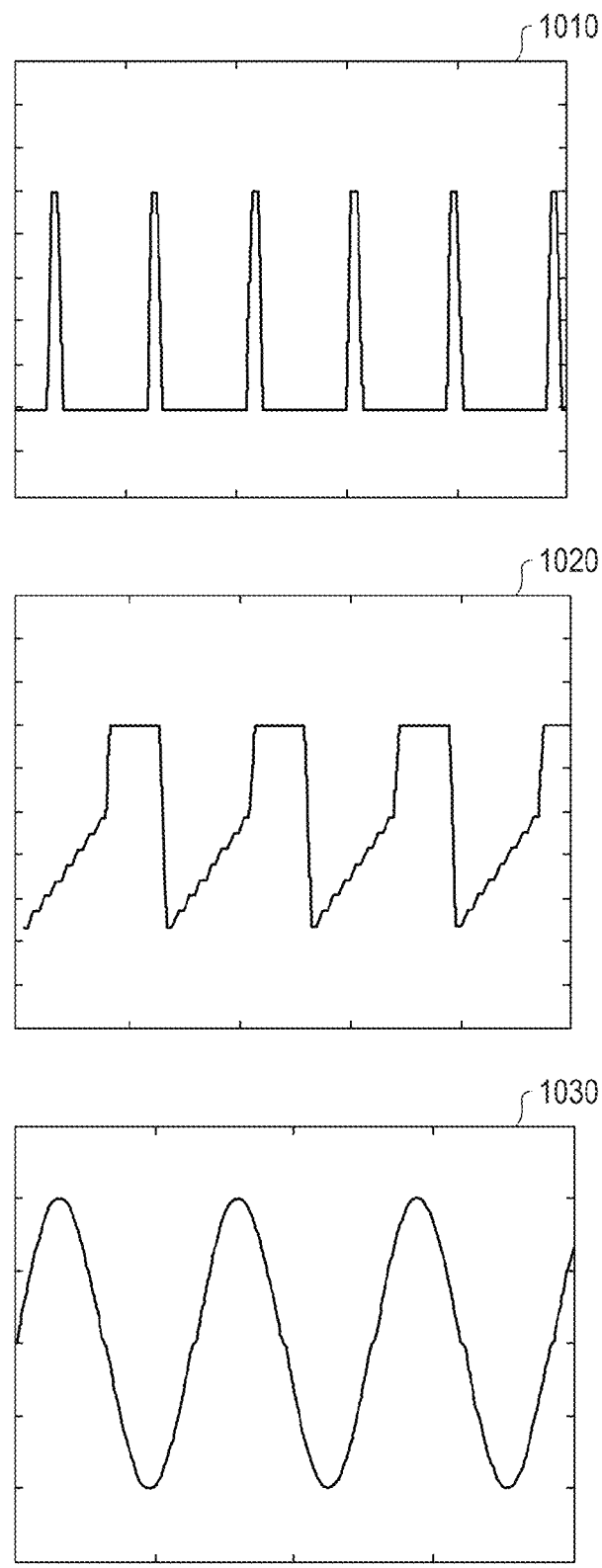
FIG. 11 illustrates multiple example periodic spikes, in accordance with an embodiment of the invention.

FIG. 11 illustrates multiple example periodic spikes, in accordance with an embodiment of the invention. Based on the control pulses generated by the synchronization unit 230, each neuron 11 generates periodic spikes. A first graph 1010 illustrates a first type of periodic spikes generated by a population of periodically spiking neurons 11. A second graph 1020 illustrates a second type of periodic spikes generated by a population of periodically spiking neurons 11. A third graph 1030 illustrates a third type of periodic spikes generated by a population of periodically spiking neurons 11. As shown in graphs 1010, 1020 and 1030, each period comprises a predetermined number of clock cycles during which no spikes occur, followed by a number of spikes in succession.

Figure 12:
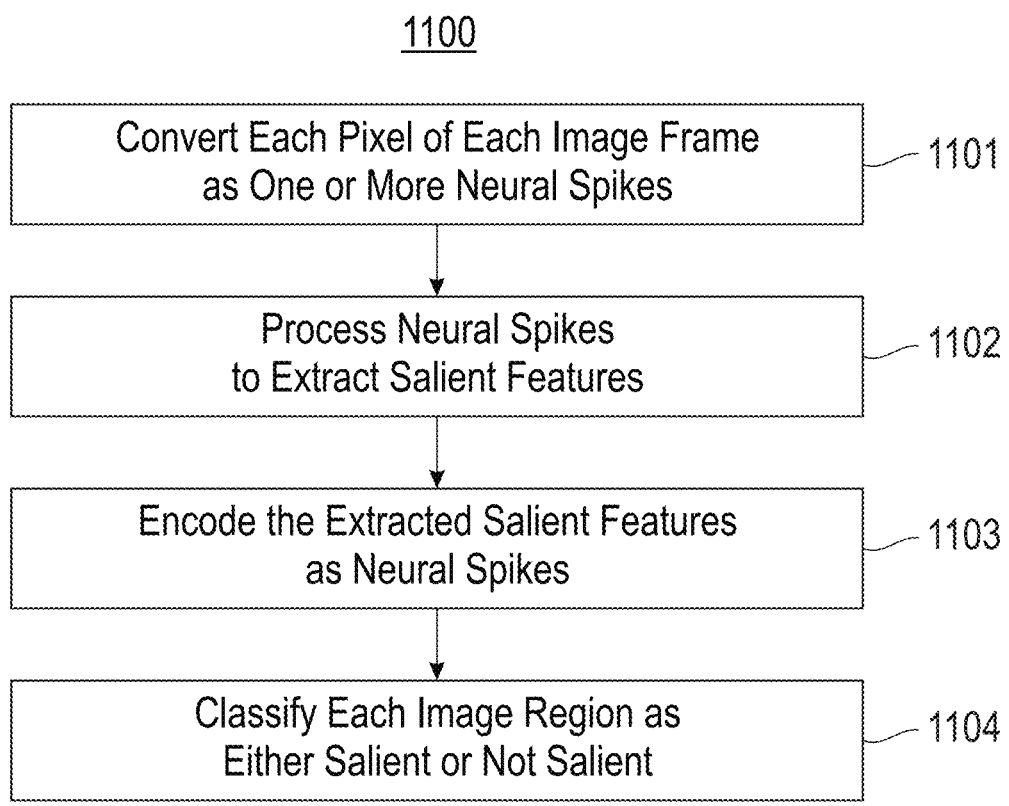
FIG. 12 illustrates a flowchart of an example process for determining regions of interest, in accordance with an embodiment of the invention.

FIG. 12 illustrates a flowchart of an example process 1100 for determining regions of interest, in accordance with an embodiment of the invention. In process block 1101, convert each pixel of each image frame as one or more neural spikes. In process block 1102, process neural spikes to extract salient features. In process block 1103, encode the extracted salient features as neural spikes. In process block 1104, classify each image region as either salient or not salient.

Figure 13:
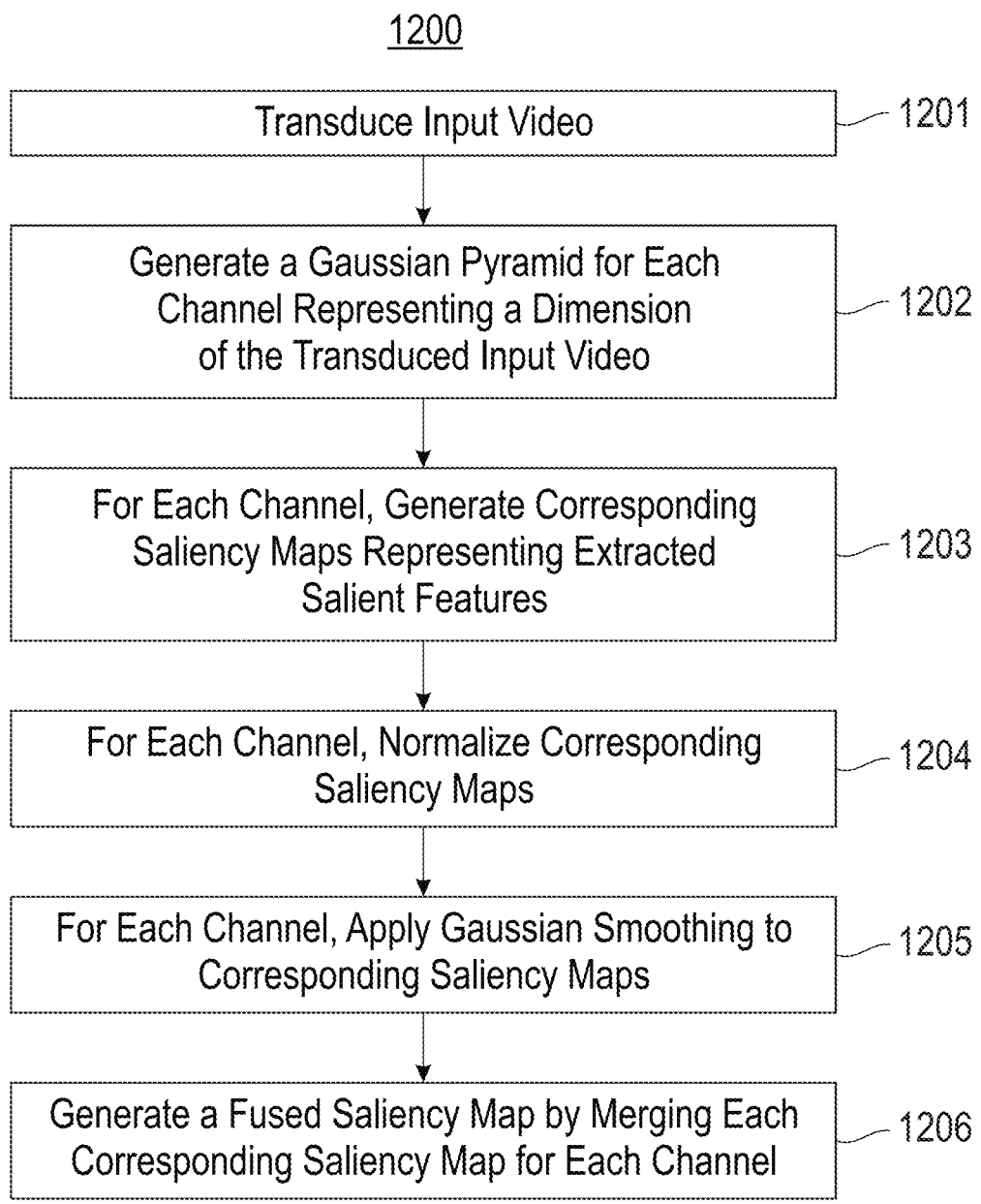
FIG. 13 illustrates a flowchart of an example process for generating and merging saliency maps, in accordance with an embodiment of the invention.

FIG. 13 illustrates a flowchart of an example process 1200 for generating and merging saliency maps, in accordance with an embodiment of the invention. In process block 1201, transducer input video. In process block 1202, generate a Gaussian pyramid for each channel representing a dimension of the transduced input video. In process block 1203, for each channel, generate corresponding saliency maps representing extracted salient features. In process block 1204, for each channel, normalize corresponding saliency maps. In process block 1205, for each channel, apply Gaussian smoothing to corresponding saliency maps. In process block 1206, generate a fused saliency map by merging each corresponding saliency map for each channel.

Figure 14:
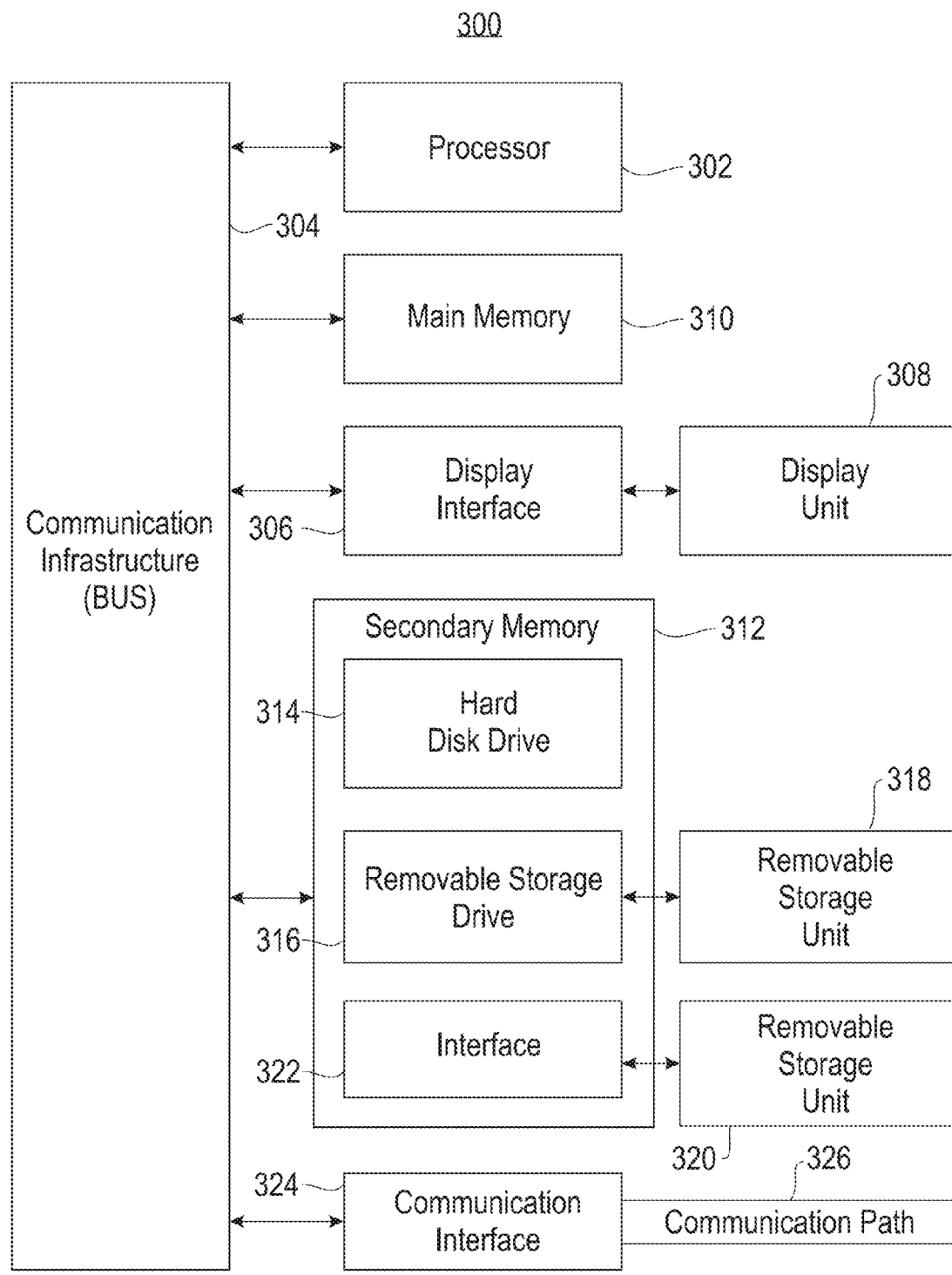
FIG. 14 is a high level block diagram showing an information processing system useful for implementing one embodiment of the present invention.

FIG. 14 is a high level block diagram showing an information processing system 300 useful for implementing one embodiment of the present invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322 which allow software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

In this document, the terms "computer program medium," "computer usable medium," and "computer readable medium" are used to generally refer to media such as main memory 310 and secondary memory 312, removable storage drive 316, and a hard disk installed in hard disk drive 314.

Computer programs (also called computer control logic) are stored in main memory 310 and/or secondary memory 312. Computer programs may also be received via communication interface 324. Such computer programs, when run, enable the computer system to perform the features of the present invention as discussed herein. In particular, the computer programs, when run, enable the processor 302 to perform the features of the computer system. Accordingly, such computer programs represent controllers of the computer system.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the above description, it can be seen that the present invention provides a system, computer program product, and method for implementing the embodiments of the invention. The present invention further provides a non-transitory computer-useable storage medium for extracting salient features from video using a neurosynaptic system. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
receiving an input sequence of image frames, wherein each image frame comprises at least one pixel channel representing a dimension of the input sequence of image frames; and
utilizing one or more neurosynaptic core circuits to estimate visual saliency for the input sequence of image frames, wherein the one or more neurosynaptic core circuits perform operations including:
for each pixel channel of each image frame:
generating a corresponding multi-scale data structure by spatially subsampling corresponding neural spiking data representing pixel intensity of each pixel of the pixel channel at different subsampling scales;
generating at least one corresponding saliency map by extracting at least one salient feature from the corresponding multi-scale data structure;
normalizing resolution of each corresponding saliency map;
applying a Gaussian smoothing operator to each corresponding saliency map to suppress speckles and enhance centers indicating salient features; and
merging each saliency map corresponding to each pixel channel into a combined saliency map representing estimated visual saliency for the input sequence of image frames.

2. The method of claim 1, wherein the operation further include:
for each pixel channel of each image frame:
encoding salient features extracted from a corresponding multi-scale data structure as neural spikes.

3. The method of claim 1, wherein each saliency map is a retinotopic map of salient features.

4. The method of claim 1, wherein the input sequence of image frames constitutes a video of one or more frames that are not necessarily related to each other.

5. The method of claim 1, wherein:
for each pixel channel of each image frame:
a corresponding multi-scale data structure comprises multiple data layers;
each data layer of the corresponding multi-scale data structure corresponds to a subsampling scale of different subsampling scales; and
the corresponding multi-scale data structure represents a distinct multi-scale pyramidal representation of the pixel channel.

6. The method of claim 1, wherein:
for each pixel channel of each image frame:
spatially subsampling corresponding neural spiking data at different subsampling scales comprises determining a convolution of the corresponding neural spiking data by convolving the neural spiking data with a two-dimensional smoothing kernel.

7. The method of claim 1, wherein the operations further include:
for each pixel channel of each image frame:
converting pixel intensity of each pixel of the pixel channel to neural spikes based on a temporal coding scheme and a spatial coding scheme.

8. The method of claim 1, further comprising:
utilizing the one or more neurosynaptic core circuits to estimate motion saliency for the input sequence of image frames, wherein the one or more neurosynaptic core circuits further perform operations including:
for each image frame:
detecting one or more salient image regions of the image frame by identifying one or more pixel subsets where one or more changes have occurred over time.

9. The method of claim 1, wherein:
for each pixel channel of each image frame:
salient features extracted from a corresponding multi-scale data structure comprise at least one of the following: one or more mathematically defined features, and one or more learned features;
the one or more mathematically defined features include at least one of the following: one or more edge extraction operators operating on luminance and color channels, one or more texture extraction operators for extracting high frequency spatial activity, and one or more local averaging operations; and
the one or more learned features include at least one feature learned from training data using one or more of the following algorithms: k-means clustering, and input/desired output covariance.

10. A system comprising a computer processor, a computer-readable hardware storage medium, and program code embodied with the computer-readable hardware storage medium for execution by the computer processor to implement a method comprising:
receiving an input sequence of image frames, wherein each image frame comprises at least one pixel channel representing a dimension of the input sequence of image frames; and
utilizing one or more neurosynaptic core circuits to estimate visual saliency for the input sequence of image frames, wherein the one or more neurosynaptic core circuits perform operations including:
for each pixel channel of each image frame:
generating a corresponding multi-scale data structure by spatially subsampling corresponding neural spiking data representing pixel intensity of each pixel of the pixel channel at different subsampling scales;
generating at least one corresponding saliency map by extracting at least one salient feature from the corresponding multi-scale data structure;
normalizing resolution of each corresponding saliency map;
applying a Gaussian smoothing operator to each corresponding saliency map to suppress speckles and enhance centers indicating salient features; and
merging each saliency map corresponding to each pixel channel into a combined saliency map representing estimated visual saliency for the input sequence of image frames.

11. The system of claim 10, wherein the operation further include:
for each pixel channel of each image frame:
encoding salient features extracted from a corresponding multi-scale data structure as neural spikes.

12. The system of claim 10, wherein each saliency map is a retinotopic map of salient features.

13. The system of claim 10, wherein the input sequence of image frames constitutes a video of one or more frames that are not necessarily related to each other.

14. The system of claim 10, wherein:
for each pixel channel of each image frame:
a corresponding multi-scale data structure comprises multiple data layers;

each data layer of the corresponding multi-scale data structure corresponds to a subsampling scale of different subsampling scales; and the corresponding multi-scale data structure represents a distinct multi-scale pyramidal representation of the pixel channel.

15. The system of claim 10, wherein:
for each pixel channel of each image frame:
spatially subsampling corresponding neural spiking data at different subsampling scales comprises determining a convolution of the corresponding neural spiking data by convolving the neural spiking data with a two-dimensional smoothing kernel.

16. The system of claim 10, wherein the operations further include:
for each pixel channel of each image frame:
converting pixel intensity of each pixel of the pixel channel to neural spikes based on a temporal coding scheme and a spatial coding scheme.

17. The system of claim 10, further comprising:
utilizing the one or more neurosynaptic core circuits to estimate motion saliency for the input sequence of image frames, wherein the one or more neurosynaptic core circuits further perform operations including:
for each image frame:
detecting one or more salient image regions of the image frame by identifying one or more pixel subsets where one or more changes have occurred over time.

18. The system of claim 10, wherein:
for each pixel channel of each image frame:
salient features extracted from a corresponding multi-scale data structure comprise at least one of the following: one or more mathematically defined features, and one or more learned features;
the one or more mathematically defined features include at least one of the following: one or more edge extraction operators operating on luminance and color channels, one or more texture extraction operators for extracting high frequency spatial activity, and one or more local averaging operations; and
the one or more learned features include at least one feature learned from training data using one or more of the following algorithms: k-means clustering, and input/desired output covariance.

19. A computer program product comprising a computer-readable hardware storage medium having program code embodied therewith, the program code being executable by a computer to implement a method comprising:
receiving an input sequence of image frames, wherein each image frame comprises at least one pixel channel representing a dimension of the input sequence of image frames; and
utilizing one or more neurosynaptic core circuits to estimate visual saliency for the input sequence of image frames, wherein the one or more neurosynaptic core circuits perform operations including:
for each pixel channel of each image frame:
generating a corresponding multi-scale data structure by spatially subsampling corresponding neural spiking data representing pixel intensity of each pixel of the pixel channel at different subsampling scales;
generating at least one corresponding saliency map by extracting at least one salient feature from the corresponding multi-scale data structure;
normalizing resolution of each corresponding saliency map;
applying a Gaussian smoothing operator to each corresponding saliency map to suppress speckles and enhance centers indicating salient features; and
merging each saliency map corresponding to each pixel channel into a combined saliency map representing estimated visual saliency for the input sequence of image frames.

20. The computer program product of claim 19, wherein:
for each pixel channel of each image frame:
a corresponding multi-scale data structure comprises multiple data layers;
each data layer of the corresponding multi-scale data structure corresponds to a subsampling scale of different subsampling scales; and
the corresponding multi-scale data structure represents a distinct multi-scale pyramidal representation of the pixel channel.

* * * * *